United States Patent
McCloghrie et al.

(10) Patent No.: US 6,286,052 B1
(45) Date of Patent: Sep. 4, 2001

(54) METHOD AND APPARATUS FOR IDENTIFYING NETWORK DATA TRAFFIC FLOWS AND FOR APPLYING QUALITY OF SERVICE TREATMENTS TO THE FLOWS

(75) Inventors: Keith McCloghrie, San Jose, CA (US); Silvano Gai, Vigliano d'Asti (IT); Shai Mohaban, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/206,067

(22) Filed: Dec. 4, 1998

(51) Int. Cl.[7] .................................................... G06F 13/00
(52) U.S. Cl. ...................... 709/238; 709/232; 709/250; 709/236; 370/235
(58) Field of Search ...................... 709/102, 103, 709/104, 227, 228, 229, 230, 232, 233, 234, 235, 236, 238, 240, 245, 250; 370/229, 230, 235

(56) References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 5,224,099 | 6/1993 | Corbalis et al. | 370/94.2 |
| 5,263,157 | 11/1993 | Janis | 395/600 |
| 5,473,599 | 12/1995 | Li et al. | 370/16 |
| 5,606,668 | 2/1997 | Shwed | 395/200.1 |
| 5,666,353 | 9/1997 | Klausmeier et al. | 370/230 |
| 5,751,967 | 5/1998 | Raab et al. | 395/200.58 |
| 5,819,042 | 10/1998 | Hansen | 395/200.52 |
| 5,832,503 | 11/1998 | Malik et al. | 707/104 |
| 5,842,040 | * 11/1998 | Hughes et al. | 710/11 |
| 5,872,928 | 2/1999 | Lewis et al. | 395/200.52 |
| 5,889,953 | 3/1999 | Thebaut et al. | 395/200.51 |
| 5,987,513 | 11/1999 | Prithviraj et al. | 709/223 |
| 6,041,347 | 3/2000 | Harsham et al. | 709/220 |
| 6,046,980 | * 4/2000 | Packer | 370/230 |
| 6,047,322 | 4/2000 | Vaid et al. | 709/224 |
| 6,091,709 | * 7/2000 | Harrison et al. | 370/235 |
| 6,104,700 | * 8/2000 | Haddock et al. | 370/235 |

OTHER PUBLICATIONS

Ortiz, Jr., S., "Active Networks: The Programmable Pipeline", *Computer* pp. Aug. 19–21, 1998.

IEEE P802.1D Standard (draft 15) "Local and Metropolitan Area Networks", pp. 1, 50–56 and 378–381 (Nov. 1997).

(List continued on next page.)

*Primary Examiner*— Viet D. Vu
(74) *Attorney, Agent, or Firm*—Cesari & McKenna, LLP

(57) ABSTRACT

A system within a computer network identifies specific traffic flows originating from a given network entity and requests and applies appropriate policy rules or service treatments to the traffic flows. A network entity includes a flow declaration component that communicates with one or more application programs executing on the entity. The flow declaration component includes a message generator and an associated memory for storing one or more traffic flow data structures. For a given traffic flow, the application program issues one or more calls to the flow declaration component providing it with information identifying the traffic flows. The flow declaration component then opens a flow management session with a local policy enforcer that obtains policy rules or service treatments for the identified flow from a policy server and applies those rules or treatments to the specific traffic flows from the network entity.

47 Claims, 10 Drawing Sheets

OTHER PUBLICATIONS

"An Emerging Trend in the Internet Services Market", Hewlett–Packard Corp. (date unknown).

Wroclawaski, J., "The Use of RSVP with IETF Integrated Services", IETF Network Working Group (Sep. 1997).

Bernet, Y. et al., "A Framework for Use of RSVP with Diff–serv Networks", IETF (Nov. 1998).

Bernet, Y. et al., "Requirements of Diff–serv Boundary Routers", IETF Differentiated Services (Nov. 1998).

Yadav, S. et al., "Identity Representation for RSVP", IETF (Jan. 1999).

Heinanen, J. et al., "Assured Forwarding PHB Group", IETF (Sep. 1998).

Jacobson, V. et al., "An Expedited Forwarding PHB", IETF Differentiated Services Working Group (Aug. 1998).

Nichols, K. et al., "Definition of the Differentiated Services Field (DS Field) in the IPv4 and IPv6 Headers", IETF Differentiated Services Working Group (Aug. 1998).

Blake, S. et al., "An Architecture For Differentiated Services", IETF Differentiated Services Working Group (Aug. 1998).

Bernet, Y. et al., "A Framework for End–to–End QoS Combining RSVP/Interserv and Differentiated Services", IETF (Mar. 1998).

Yavatkar, R. et al., "A Framework for Policy–based Admission Control", IETF (Nov. 1997).

Boyle, J. et al., "The COPS (Common Open Policy Service)Protocol", IETF (Aug. 1998).

Reichmeyer, F. et al., "COPS Usage for Differentiated Services", IETF Network Working Group (Aug. 1998).

"Cisco IOS® Software Quality of Service Solutions", Cisco Systems, Inc.(Jul. 1998).

"Queuing, Traffic Shaping, and Filtering", Cisco Systems, Inc.(Sep. 1996).

"Network Node Registry Overview" (Jan. 29, 1998).

"Network Node Registry User's Guide" (Apr. 1997).

"Network Node Registry—Access Control Lists" (Apr. 1997).

"Quality of Service Policy Propagation via Border Gateway Protocol", Cisco Systems, Inc. (Feb. 1998).

"Distributed Weighted Random Early Detection", Cisco Systems, Inc., pp. 1–6 (Feb. 1998).

"Distributed Weighted Fair Queuing", Cisco Systems, Inc. (Mar. 1998).

"Action Request System®", Remedy Corporation (1998).

"3COM's Framework for Delivering Policy–Powered Networks", 3Com Corporation (Jun. 1998).

* cited by examiner

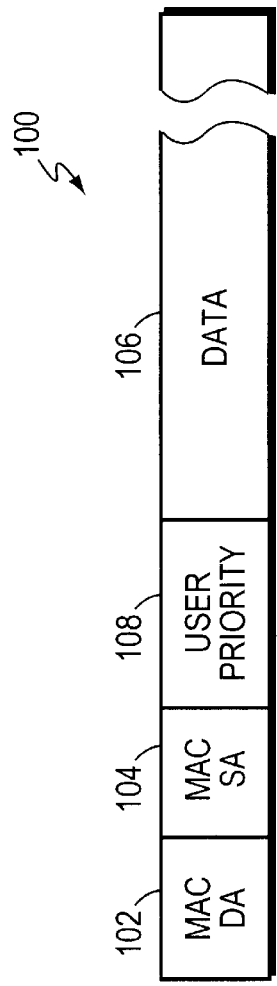
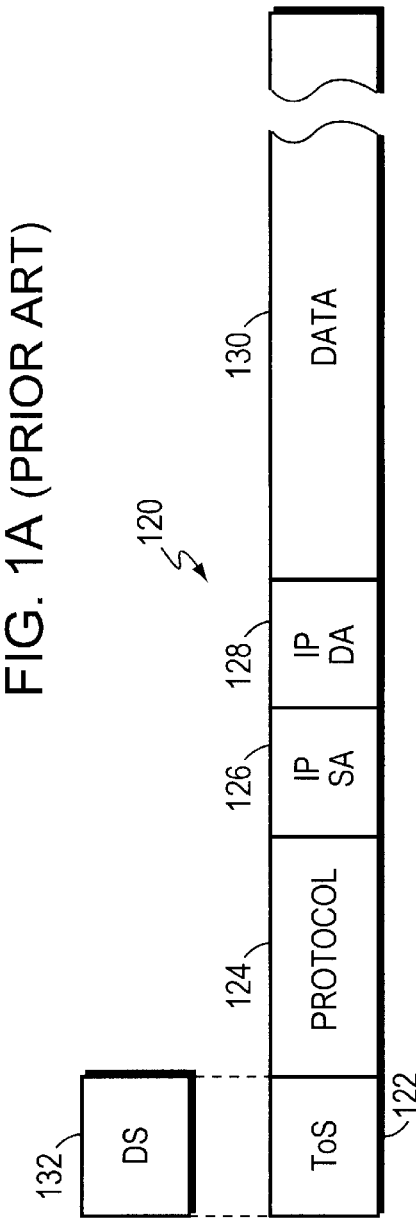
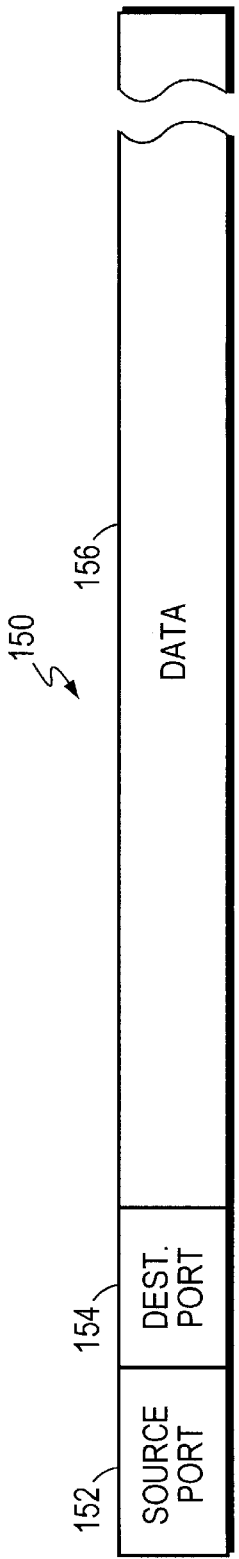
FIG. 1A (PRIOR ART)
FIG. 1B (PRIOR ART)
FIG. 1C (PRIOR ART)

METHOD AND APPARATUS FOR IDENTIFYING NETWORK DATA TRAFFIC FLOWS AND FOR APPLYING QUALITY OF SERVICE TREATMENTS TO THE FLOWS

CROSS-REFERENCE TO RELATED APPLICATIONS

This application is related to the following copending U.S. patent application:

U.S. patent application Ser. No. 09/179,036 entitled, METHOD AND APPARATUS FOR DEFINING AND IMPLEMENTING HIGH-LEVEL QUALITY OF SERVICE POLICIES IN COMPUTER NETWORKS, filed Oct. 26, 1998, now U.S. Pat. No. 6,167,495, and assigned to the assignee of the present application.

FIELD OF THE INVENTION

The present invention relates generally to computer networks, and more specifically, to a method and apparatus for identifying network data traffic flows and for applying quality of service or policy treatments thereto.

BACKGROUND OF THE INVENTION

A computer network typically comprises a plurality of interconnected entities that transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hook-ups, etc. to form a wide area network ("WAN"), metropolitan area network ("MAN") or intranet. These LANs and/or WANs, moreover, may be coupled through one or more gateways to the Internet.

Each network entity preferably includes network communication software, which may operate in accordance with the well-known Transport Control Protocol/Internet Protocol (TCP/IP). TCP/IP basically consists of a set of rules defining how entities interact with each other: In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity wishes to communicate with another entity, it formulates one or more messages and passes them to the upper layer of the TCP/IP communication stack. These to messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at layer 2 which, in the OSI Reference Model, is called the data link layer and includes the Logical Link Control (LLC) and Media Access Control (MAC) sub-layers.

Other intermediate devices, commonly referred to as routers, may operate at higher communication layers, such as layer 3, which in TCP/IP networks corresponds to the Internet Protocol (IP) layer. IP data packets include a corresponding header which contains an IP source address and an IP destination address. Routers or layer 3 switches may re-assemble or convert received data frames from one LAN standard (e.g., Ethernet) to another (e.g. Token Ring). Thus, layer 3 devices are often used to interconnect dissimilar subnetworks. Some layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request for Comments (RFC) 1700. For example, TCP/UDP port number 80 corresponds to the hyper text transport protocol (HTTP), while port number 21 corresponds to file transfer protocol (ftp) service.

Allocation of Network Resources

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc.

Individual frames or packets, moreover, can be marked so that intermediate devices may treat them in a predetermined manner. For example, the Institute of Electrical and Electronics Engineers (IEEE), in an appendix (802.1p) to the 802.1D bridge standard, describes additional information for the MAC header of Data Link Layer frames. FIG. 1 is a partial block diagram of a Data Link frame 100 which includes a MAC destination address (DA) field 102, a MAC source address (SA) field 104 and a data field 106. In accordance with the 802.1Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields (not shown). The sub-fields include a three bit IP precedence (IPP) field and three one bit flags (Delay, Throughput and Reliability). By setting the various flags, an entity may indicate which overall service it cares most about (e.g., Throughput versus Reliability). Version 6 of the Internet Protocol (I Pv6) similarly defines a traffic class field, which is also intended to be used for defining the type of service to be applied to the corresponding packet.

Recently, a working group of the Internet Engineering Task Force (IETF), which is an independent standards organization, has proposed replacing the ToS field 112 of Network Layer packets 120 with a one octet differentiated services (DS) field 132 that can be loaded with a differentiated services codepoint. Layer 3 devices that are DS compliant apply a particular per-hop forwarding behavior to data packets based on the contents of their DS fields 132. Examples of per-hop forwarding behaviors include expedited forwarding and assured forwarding. The DS field 132 is typically loaded by DS compliant intermediate devices located at the border of a DS domain, which is a set of DS compliant intermediate devices under common network administration. Thereafter, interior DS compliant devices along the path simply apply the corresponding forwarding behavior to the packet 120.

FIG. 1C is a partial block diagram of a Transport Layer packet 150. The network layer packet 150 preferably includes a source port field 152, a destination port field 154 and a data field 156, among others. Fields 152 and 154 are preferably loaded with the predefined or dynamically agreed-upon TCP or UDP port numbers being utilized by the corresponding network entities.

Service Level Agreements

To interconnect dispersed computer networks, many organizations rely on the infrastructure and facilities of internet service providers (ISPs). For example, an organization may lease a number of T1 lines to interconnect various LANs. These organizations and ISPs typically enter into service level agreements, which include one or more traffic specifiers. These traffic specifiers may place limits on the amount of resources that the subscribing organization will consume for a given charge. For example, a user may agree not to send traffic that exceeds a certain bandwidth (e.g., 1 Mb/s). Traffic entering the service provider's network is monitored (i.e., "policed") to ensure that it complies with the relevant traffic specifiers and is thus "in-profile". Traffic that exceeds a traffic specifier (i.e., traffic that is "out-of-profile") may be dropped or shaped or may cause an accounting change (i.e., causing the user to be charged a higher rate). Another option is to mark the traffic as exceeding the traffic specifier, but nonetheless allow it to proceed through the network. If there is congestion, an intermediate network device may drop such "marked" traffic first in an effort to relieve the congestion.

Multiple Traffic Flows

A process executing at a given network entity, moreover, may generate hundreds if not thousands of traffic flows that are transmitted across the corresponding network every day. A traffic flow generally refers to a set of messages (frames and/or packets) that typically correspond to a particular task, transaction or operation (e.g., a print transaction) and may be identified by 5 network and transport layer parameters (e.g., source and destination IP addresses, source and destination TCP/UDP port numbers and transport protocol). Furthermore, the treatment that should be applied to these different traffic flows varies depending on the particular traffic flow at issue. For example, an on-line trading application may generate stock quote messages, stock transaction messages, transaction status messages, corporate financial information messages, print messages, data back-up messages, etc. A network administrator, moreover, may wish to have very different policies or service treatments applied to these various traffic flows. In particular, the network administrator may want a stock quote message to be given higher priority than a print transaction. Similarly, a $1 million stock transaction message for a premium client should be assigned higher priority than a $100 stock transaction message for a standard customer. Most intermediate network devices, however, lack the ability to distinguish among multiple traffic flows, especially those originating from the same host or server.

SUMMARY OF THE INVENTION

It is an object of the present invention to provide a method and apparatus for identifying one or more traffic flows from a source entity.

It is a further object of the present invention to provide a method and apparatus for obtaining traffic policies to be applied to identified traffic flows.

It is a further object of the present invention to manage traffic flows in accordance with corresponding policies.

Briefly, the invention relates to a method and apparatus for identifying specific traffic flows originating from a network entity and for applying predetermined policy or service treatments to those flows. In particular, a network entity includes a flow declaration component that is coupled to one or more application programs executing on the entity. The network entity also includes a communication facility that supports message exchange between the application program and other network entities. The flow declaration component includes a message generator and an associated memory for storing one or more traffic flow data structures. For a given traffic flow, the application program calls the flow declaration component and provides it with one or more identifying parameters corresponding to the given flow. In particular, the application program may provide network and transport layer parameters, such as IP source and destination addresses, TCP/UDP port numbers and transport protocol associated with the given traffic flow. It also provides one or more application-level parameters, such as a transaction-type (e.g., a stock transaction), a sub-transaction-type (e.g., a $1 Million stock purchase order), etc. The flow declaration component provides this information to a local policy enforcer, which, in turn, may query a policy server to obtain one or more policy or service treatments that are to be applied to the identified traffic flow. The local policy enforcer then monitors the traffic originating from the network entity and, by examining IP source and destination addresses, among other information, applies the prescribed policy or service treatments to the given traffic flow.

In the preferred embodiment, the application program and the flow declaration component at the network entity interact through an Application Programming Interface (API) layer, which includes a plurality of system calls. In addition, the flow declaration component generates and transmits one or more application parameter declaration (APD) messages to the local policy enforcer. The APD messages contain the network and transport layer parameters (e.g., IP source and destination addresses, TCP/UDP port numbers and transport protocol) stored at the traffic flow data structure for the given flow. The messages may also contain the application-level parameters specified by the application program. The information, moreover, may be in the form of objects generated by the flow declaration component. Preferably, the flow declaration component and the local policy enforcer exchange messages in accordance with a novel protocol that defines a message scheme in addition to a message format. The local policy enforcer and the policy server may utilize the Common Open Policy Service (COPS) protocol to request and receive particular policies or service treatment rules. Preferably, the policy server maintains or otherwise has access to a store of network policies established by the network administrator.

In another aspect of the invention, the local policy enforcer may establish a traffic flow state that includes the policy or service treatments specified by the policy server. It then monitors the traffic flows originating from the network entity looking for the given traffic flow. Once the given traffic flow is identified, the local policy enforcer applies the policy or service treatments set forth in the corresponding traffic flow state. For example, the policy enforcer may mark the packets or frames with a high priority DS codepoint. When the given traffic flow is complete, the application program may notify the flow declaration component, which, in turn, signals the end of the traffic flow to the local policy enforcer. The policy enforcer may request authorization from the policy server to release or otherwise discard the respective traffic flow state.

In an alternative embodiment of the invention, policy rules may be cached at the local policy enforcer to eliminate the need to query the policy server for each new traffic flow.

In another embodiment of the invention, the APD messages are replaced with one or more enhanced Path or Reservation messages as originally specified in the Resource ReSerVation Protocol (RSVP).

BRIEF DESCRIPTION OF THE DRAWINGS

The above and further advantages of the invention may be better understood by referring to the following description in conjunction with the accompanying drawings, in which:

FIGS. 1A–1C, previously discussed, are partial block diagram of network messages;

DETAILED DESCRIPTION OF THE PREFERRED EMBODIMENT

Figure 2:
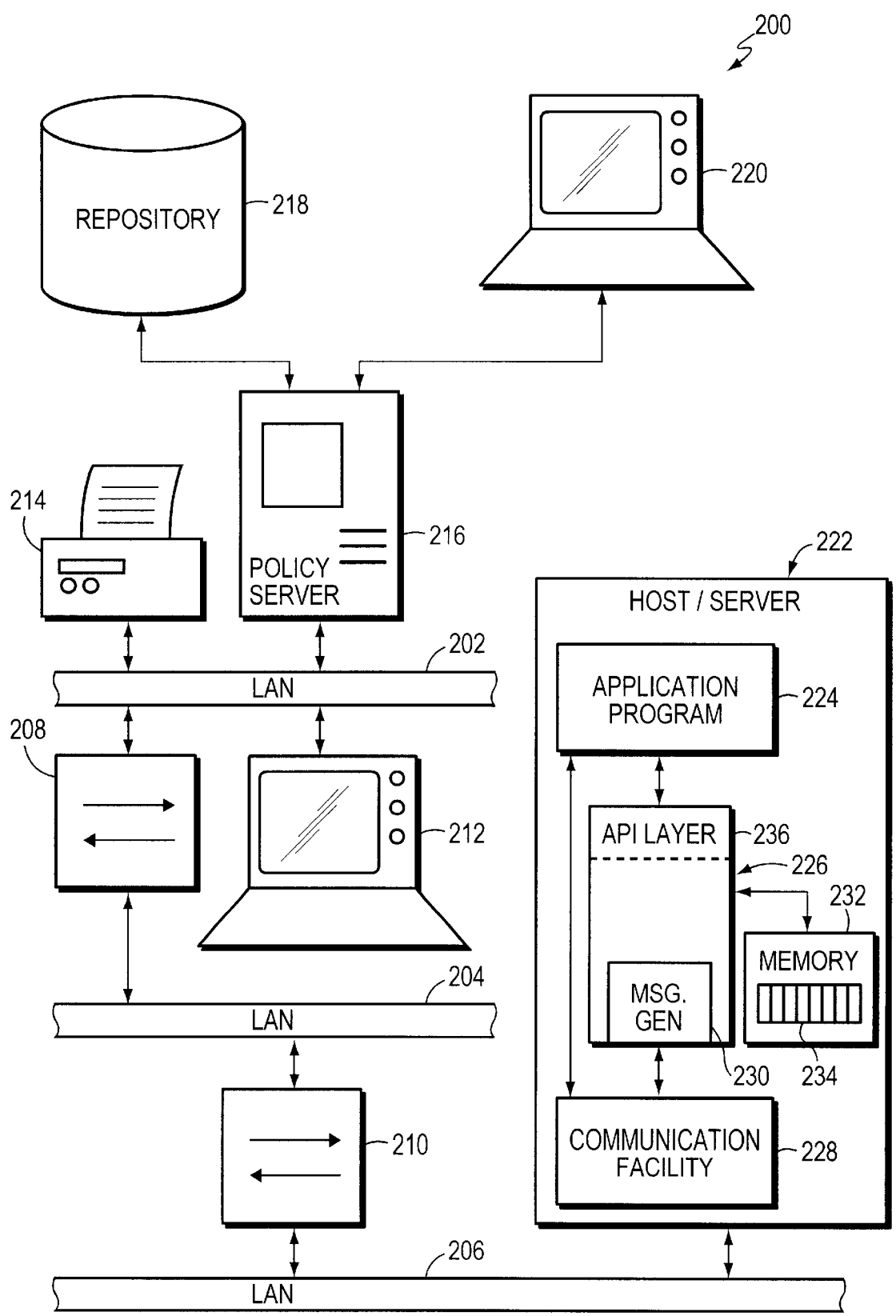
FIG. 2 is a highly schematic block diagram of a computer network.

FIG. 2 is a highly schematic block diagram of a computer network 200. The network 200 includes a plurality of local area networks (LANs) 202, 204 and 206 that are interconnected by a plurality of intermediate network devices 208, 210. Coupled to the LANs are a plurality of entities, such as end station 212 and print server 214. The network further includes at least one policy server 216 that may be coupled to a repository 218 and to a network administrator's station 220. A server suitable for use as policy server 216 is any Intel x86/Windows NT® or Unix-based platform. The network 200 also includes at least one host or server 222 configured in accordance with the present invention.

In particular, the host/server 222 includes at least one application program or process 224, a flow declaration component 226 and a communication facility 228. The flow declaration component 226 includes a message generator 230 that is in communicating relation with the communication facility 228. Component 226 is also coupled to an associated memory 232 for storing one or more traffic flow data structures 234. The application program 224 is in communicating relation with both the communication facility 228 and, through an Application Programming Interface (API) layer 236, to the flow declaration component 226. The communication facility 228, in turn, is connected to network 200 via LAN 206. The host/server 222 also comprises conventional programmable processing elements (not shown), which may contain software program instructions pertaining to the methods of the present invention. Other computer readable media may also be used to store the program instructions.

The communication facility 228 preferably includes one or more software libraries for implementing a communication protocol stack allowing host/server 222 to exchange messages with other network entities, such as end station 212, print server 214, etc. In particular, the communication facility 228 may include software layers corresponding to the Transmission Control Protocol/Internet Protocol (TCP/IP), the Internet Packet Exchange (IPX) protocol, the Apple-Talk protocol, the DECNet protocol and/or NetBIOS Extended User Interface (NetBEUI). Communication facility 228 further includes transmitting and receiving circuitry and components, including one or more network interface cards (NICs) that establish one or more physical ports to LAN 206 or other LANs for exchanging data packets and frames.

Intermediate network devices 208, 210 provide basic bridging functions including filtering of data traffic by medium access control (MAC) address, "learning" of a MAC address based upon a source MAC address of a frame and forwarding of the frame based upon a destination MAC address or route information field (RIF). They may also include an Internet Protocol (IP) software layer and provide route processing, path determination and path switching functions. In the illustrated embodiment, the intermediate network devices 208, 210 are computers having transmitting and receiving circuitry and components, including network interface cards (NICs) establishing physical ports, for exchanging data frames. Intermediate network device 210, moreover, is preferably configured as a local policy enforcer for traffic flows originating from host/server 222, as described below.

It should be understood that the network configuration 200 of FIG. 2 is for illustrative purposes only and that the present invention will operate with other, possibly far more complex, network topologies. For example, the repository 218 and network administrator's station 220 may be directly or indirectly connected to the policy server 216 (e.g., through one or more intermediate devices).

Figure 3:
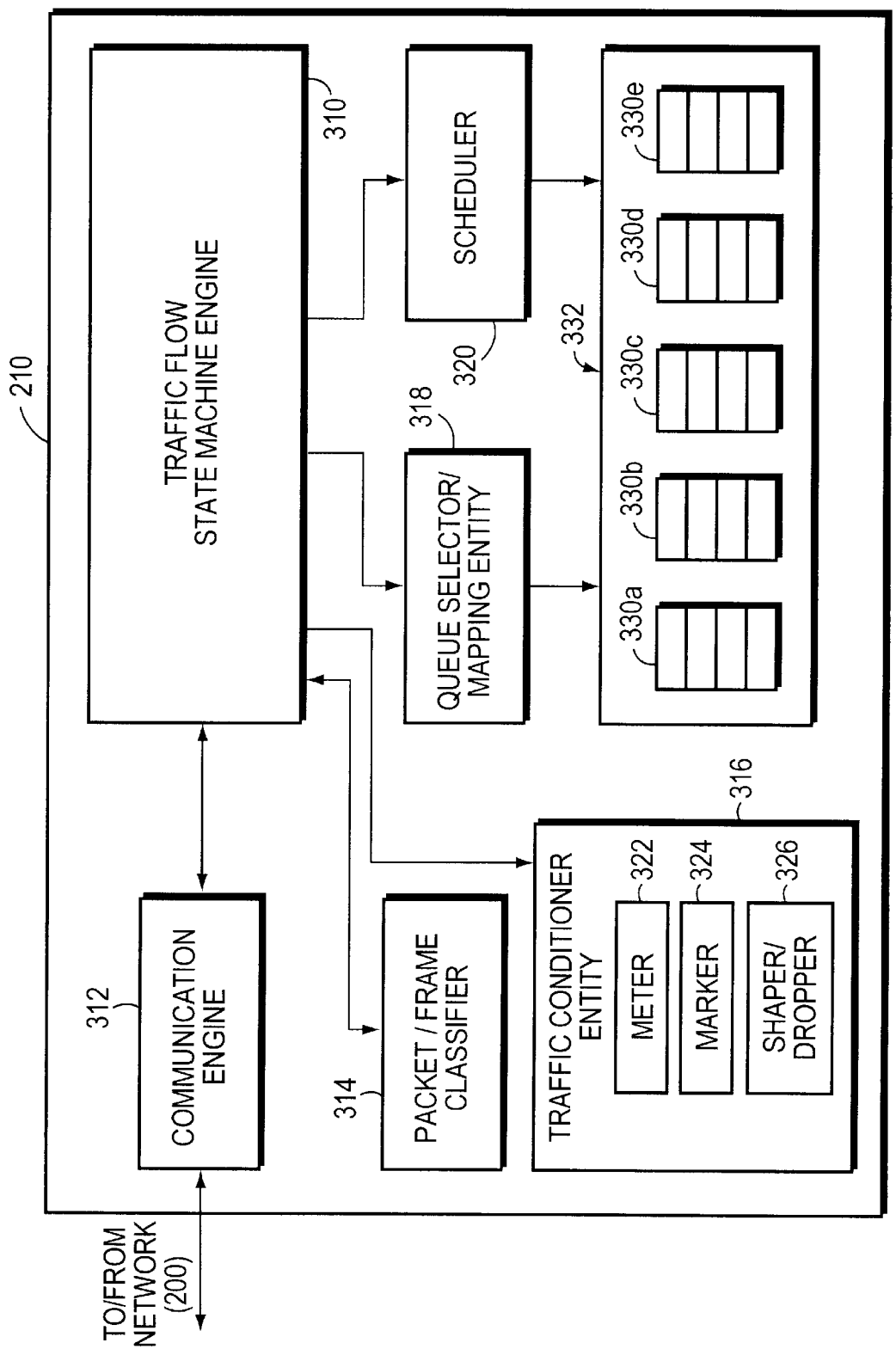
FIG. 3 is a highly schematic, partial block diagram of local policy enforcer.

FIG. 3 is a partial block diagram of local policy enforcer 210. Local policy enforcer 210 includes a traffic flow state machine engine 310 for maintaining flow states corresponding to host/server 222 traffic flows, as described below. The traffic flow state machine engine 310 is coupled to a communication engine 312. The communication engine 312 is configured to formulate and exchange messages with the policy server 216 and the flow declaration component 226 at host/server 222. That is, communication engine 312 includes or has access to conventional circuitry for transmitting and receiving messages over the network 200. The traffic flow state machine engine 310 is also coupled to several traffic management resources and mechanisms. In particular, traffic flow state machine engine 310 is coupled to a packet/frame classifier 314, a traffic conditioner entity 316, a queue selector/mapping entity 318 and a scheduler 320. The traffic conditioner entity 316 includes several sub-components, including one or more metering entities 322, one or more marker entities 324, and one or more shaper/dropper entities 326. The queue selector/mapping entity 318 and scheduler 320 operate on the various queues established by local policy enforcer 210 for its ports and/or interfaces, such as queues 330a–330e corresponding to an interface 332.

The term intermediate network device is intended broadly to cover any intermediate device for interconnecting end stations of a computer network, including, without limitation, layer 3 devices or routers, as defined by Request for Comments (RFC) 1812 from the Internet Engineering Task Force (IETF), intermediate devices that are only partially compliant with RFC 1812, intermediate devices that provide additional functionality, such as Virtual Local Area Network (VLAN) support, IEEE 802.1Q support and/or IEEE 802.1D support, etc. Intermediate network device also includes layer 2 intermediate devices, such as switches and bridges, including, without limitation, devices that are fully or partially compliant with the IEEE 802.1D standard and intermediate devices that provide additional functionality, such as VLAN support, IEEE 802.1Q support and/or IEEE 802.1p support, Asynchronous Transfer Mode (ATM) switches, Frame Relay switches, etc.

FIGS. 4A–4D are flow diagrams illustrating a preferred message scheme, relative to time t, in accordance with the present invention. In general, application program 224 identifies one or more anticipated traffic flows to the flow declaration component 226, which, in turn, notifies the local policy enforcer 210. The local policy enforcer 210 requests and receives from the policy server 216 corresponding policy or service treatments for the anticipated traffic flows. Local policy enforcer 210 then monitors the traffic originating from host/server 222 to identify those frames and/or packets corresponding to the identified flows. When such a flow is detected, local policy enforcer 210 applies the specified policy or service treatments to corresponding data frames and/or packets.

Identification of Traffic Flows

Assume that application program 224 is a stock transaction program that can provide stock quotes to and process stock transactions from remote clients, such as end station 212. The application program 224 preferably communicates with end station 212 across network 200 through the communication facility 228 at host/server 222 in a conventional manner. Program 224 also communicates with the flow declaration component 226 preferably through a plurality of application programming interface (API) system calls to API layer 236. These API calls are generally issued by the program 224 along with one or more arguments and may be returned by the flow declaration component 226.

In particular, upon initialization at host/server 222, the application program 224 preferably issues a StartUp( ) API call 410 to the API layer 236 at flow declaration component 226. Program 226 preferably loads the StartUp( ) call 410 with an application identifier that uniquely identifies application program 224 to component 226 as an argument. The application identifier may be a globally unique identifier (GUID), which is a 128 bit long value typically provided by the application developer, although other identifiers may also be used (e.g., application name). The StartUp( ) call 410 may be returned by the flow declaration component 226 with a version number as an argument. The version number corresponds to the version of software being executed by the flow declaration component 226. Other arguments, such as the quality-of-service (QoS) and/or traffic management resources that are available to traffic flows originating from program 224, may also be returned by flow declaration component 226.

For example, assume end station 212 contacts program 224 and requests a stock quote for a particular equity (e.g., IBM common stock). Program 224 retrieves the requested information and prepares a message containing the requested stock quote for transmission to end station 212. Before program 224 commences the traffic flow corresponding to requested stock quote, it preferably issues a NewBindings( ) call 412 to the API layer 236 of the flow declaration component 226. The NewBindings( ) call 412 is used to inform flow declaration component 226 of an anticipated traffic flow to which some policy or service treatments should be applied. In response to the NewBindings( ) call 412, flow declaration component 226 generates a bindings handle, e.g., H1, and creates a traffic flow data structure 234 within associated memory 232. Component 226 also maps or associates the traffic flow data structure 234 with the returned bindings handle H1. Flow declaration component 226 also returns the NewBindings( ) call 412 to program 224 with the handle H1 as an argument.

Next, traffic flow data structure 234 is loaded with information identifying the anticipated traffic flow. More specifically, program 224 next issues one or more network and transport layer parameter "Set" API calls 414. These Set calls 414 are used by the flow declaration component 226 to load traffic flow data structure 234 with network and transport layer parameters, such as Internet Protocol (IP) addresses and TCP/UDP port is numbers. For example, program 224 may issue a SetSourcePort( ) call 414a using the returned handle, H1, and the transport layer port number (e.g., TCP port number 1098) to be utilized by program 226 as its arguments. In response, flow declaration component 226 loads the identified source port number (i.e., 1098) into the traffic flow data structure 234 corresponding to handle H1. Flow declaration component 226 may return an acknowledgment to program 224 as an argument to the SetSourcePort( ) call 414a. If a problem arises, flow declaration component 226 may return an error message (e.g., insufficient memory, unknown handle, out of bound port number, etc.) as the argument.

In a similar manner, program 224 preferably causes the flow declaration component 226 to load the corresponding traffic flow data structure 234 with its IP address, the transport layer protocol (e.g., TCP) and the destination port number and IP address of the receiving process at end station 212. More specifically, in addition to the SetSourcePort( ) call 414a, program 224 may issue one or more of the following API system calls:

SetSourceIP( ) 414b;
SetTransportProtocol( ) 414c;
SetDestinationPort( ) 414d; and
SetDestinationIP( ) 414e.

Again, program 224 uses the previously returned handle, H1, and the corresponding information (e.g., IP address, transport protocol or port number) as arguments to these API calls. As each Set API call 414 is received, the flow declaration component 226 loads the identified parameter into the traffic flow data structure 234. Flow declaration component 226 may similarly return the Set API call 414 with an error code or an acknowledgment as an argument. It should be understood that additional "Set" API calls 414 may be defined depending on the format of the included information. For example, by utilizing a SetSourceIPByLong( ) call (not shown), program 224 may specify its IP address as a 32 bit binary sequence. Alternatively, by utilizing a SetSourceIPByString( ) call (not shown), program 224 may specify its IP address in dotted decimal format (e.g., 128.120.52.123) or as a host name (e.g., name.department.company.domain). In addition, a single SetNetworkTransportParameters( ) system call may be defined to set all of the network and transport layer parameters at once.

It should be understood that application program 224 may obtain IP source and destination addresses, port numbers and transport protocol for use in communicating with end station 212 from the communication facility 228 in a conventional manner. It should be further understood that application program 224 may utilize one or more wildcards when specifying the network and transport layer parameters.

In addition to the network and transport layer parameters (e.g., source and destination IP addresses, transport protocol and source and destination TCP/UDP port numbers) which correspond to a particular flow of traffic, program 236 may specify other identifying characteristics and/or policy elements of the anticipated traffic flow. That is, program 224 may issue one or more application-level "Set" API calls 416 to the flow declaration component 226. For example, a SetInteger( ) call 416a may be used to specify some numerical aspect (e.g., the size of a file being transferred) of the anticipated traffic flow. The arguments of the SetInteger( ) call 416a include the handle H1, the numeric policy element (e.g., 786 Kbytes) and a policy element identifier (PID) that maps the numeric policy element to a particular type or class of information (e.g., file size). When the traffic type data structure 234 is subsequently transferred to and processed by other entities, as described below, the PID will identify its corresponding information. In response to the SetInteger( ) call 416a, flow declaration component 226 loads the traffic flow data structure 234 with the numeric policy element and the PID. Flow declaration component 226 may return the SetInteger( ) call 416a to program 224 with an acknowledgment or error message as arguments.

Other application-level Set calls may also be defined. For example, a SetFloat( ) call 416b is used to associate a numeric value represented in floating decimal format with the anticipated traffic flow. A SetString( ) call 416c may be used to associate an alpha-numeric string with the anticipated flow. For example, if the anticipated traffic flow is to contain a video segment, program 224 may identify the name of the particular video segment and/or the viewer by utilizing the SetString( ) call 416c. Program 224 uses the handle H1 and the particular alpha-numeric string as arguments for the SetString( ) call 416c. A PID that maps an alpha-numeric string to name of a video segment is also included. This information is similarly loaded into the corresponding traffic flow data structure 234 by the flow declaration component 226. A generic Set( ) call 416d may be used for specifying traffic flow characteristics that do not correspond to integer, floating decimal point or alpha-numeric string formats. For example, program 224 may specify a policy element in the well-known eXternal Data Representation (XDR) format. This XDR policy element is included as an argument in the Set( ) call 416d to the flow declaration component 226, which, in response, simply copies the XDR policy element into traffic flow data structure 234. The policy element may alternatively be specified using the well-known Abstract Syntax Notation One (ASN.1) format, or any other similar translation or encoding techniques.

The application-level parameters may encompass a whole range of information relating to different aspects of the traffic flow from the application program 224. For example, application-level parameters include such information as user name (e.g., John Smith), user department (e.g., engineering, accounting, marketing, etc.), application name (e.g., SAP R/3, PeopleSoft, etc.), application module (e.g., SAP R/3 accounting form, SAP R/3 order entry form, etc.), transaction type (e.g., print), sub-transaction type (e.g., print on HP Laser Jet Printer), transaction name (e.g., print monthly sales report), sub-transaction name (e.g., print monthly sales report on A4 paper), application state (e.g., normal mode, critical mode, primary mode, back-up mode, etc.). For a video streaming application, the application-level parameters might include user name, film name, film compression method, film priority, optimal bandwidth, etc. Similarly, for a voice over IP application, the application-level parameters may include calling party, called party, compression method, service level of calling party (e.g., gold, silver, bronze), etc. In addition, for World Wide Web (WWW) server-type applications, the application-level parameters may include Uniform Resource Locator (URL) (e.g., http://www.altavista.com/cgi-in/query?pg=aq&kl=en&r=&search=Search&q=Speech+ne ar+recognition), front-end URL (e.g., http://www.altavista.com), back-end URL (e.g., query?pg=aq&kl=en&r=&search=Search&q=Speech+near+recognition), mime type (e.g., text file, image file, language, etc.), file size, etc. Those skilled in the art will recognize that many other application-level parameters may be defined.

Figure 4A:
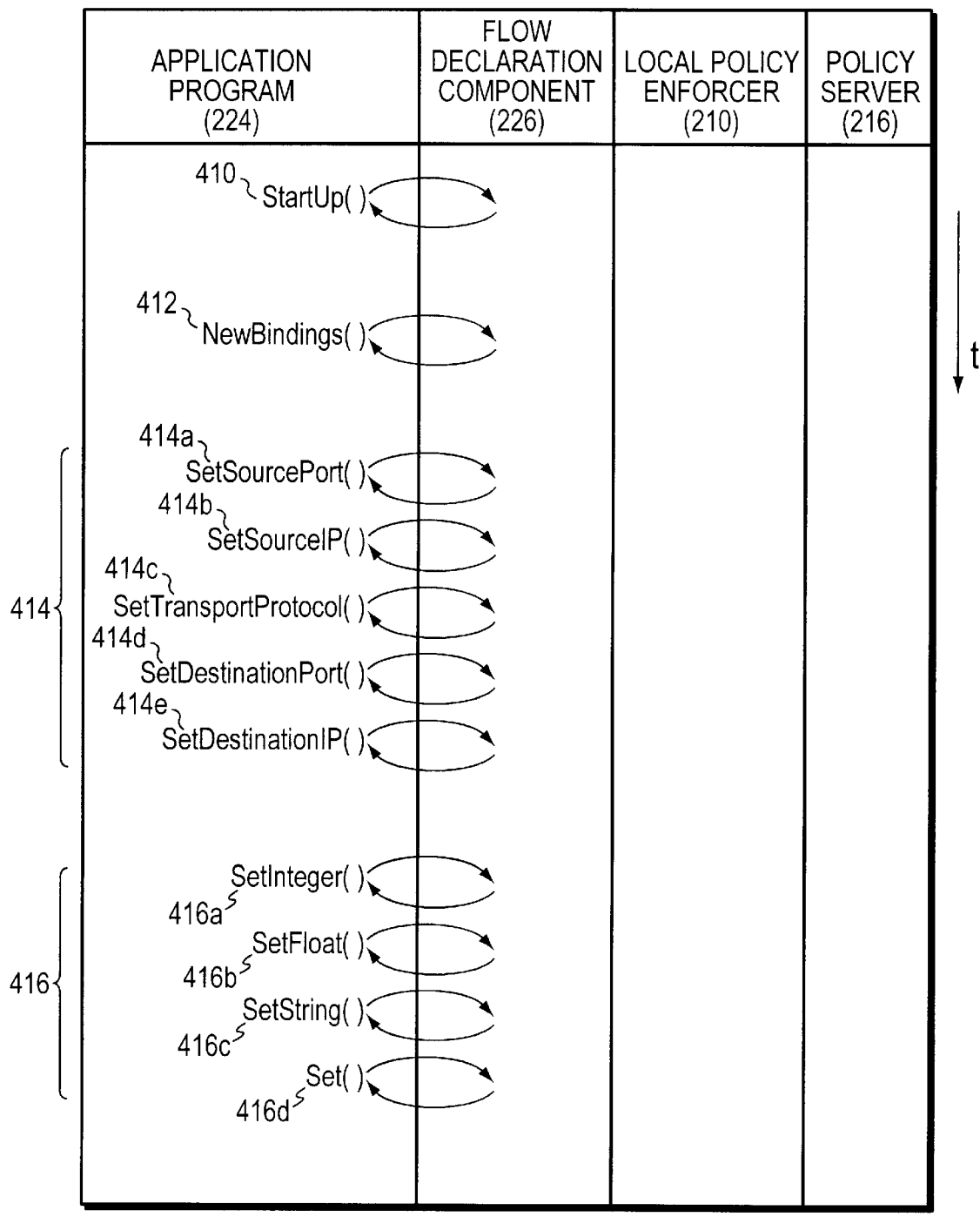
FIGS. 4A–4D are flow diagrams illustrating the message scheme and tasks performed in identifying a traffic flow and obtaining the corresponding policies.
Figure 4B:
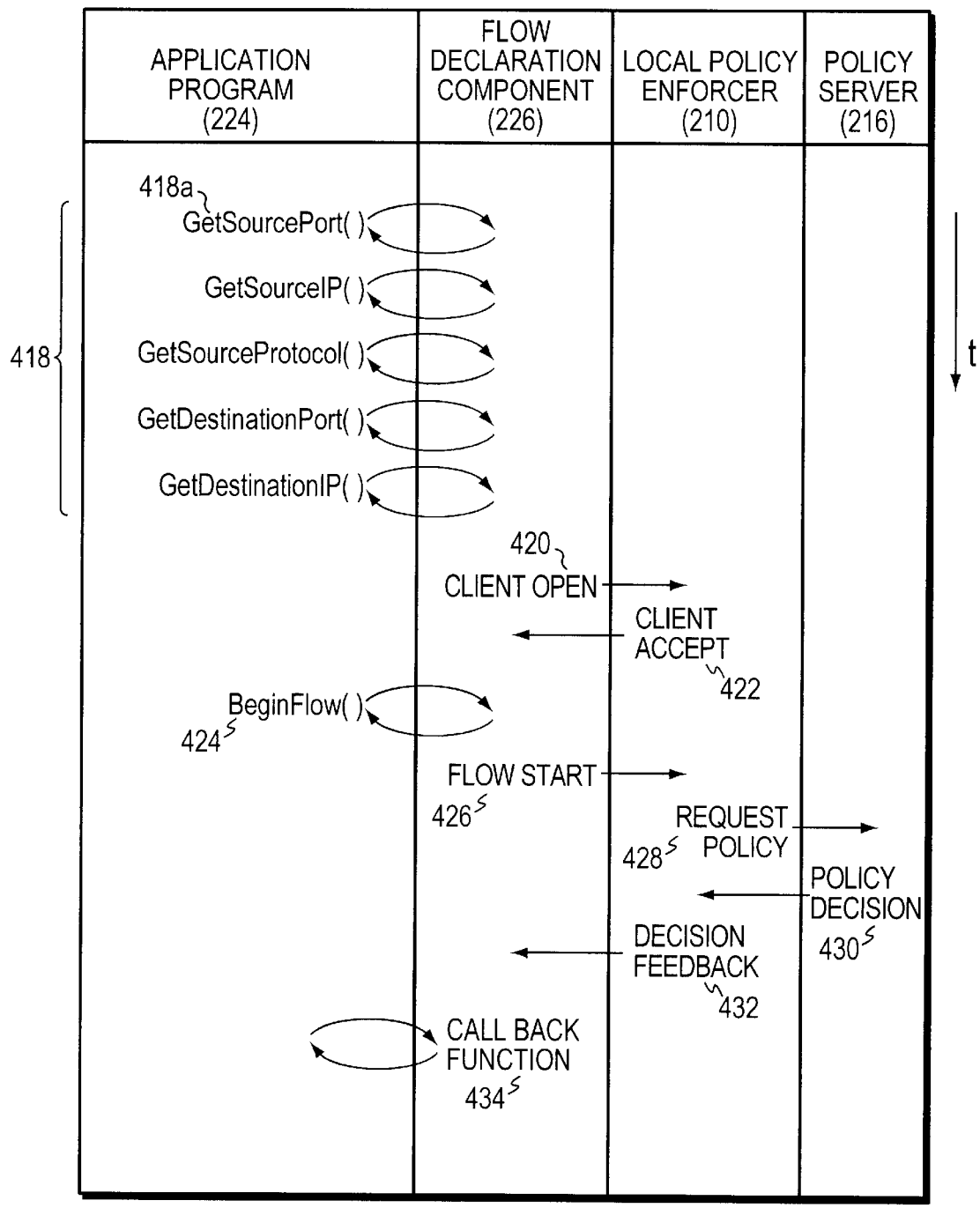
Figure 4C:
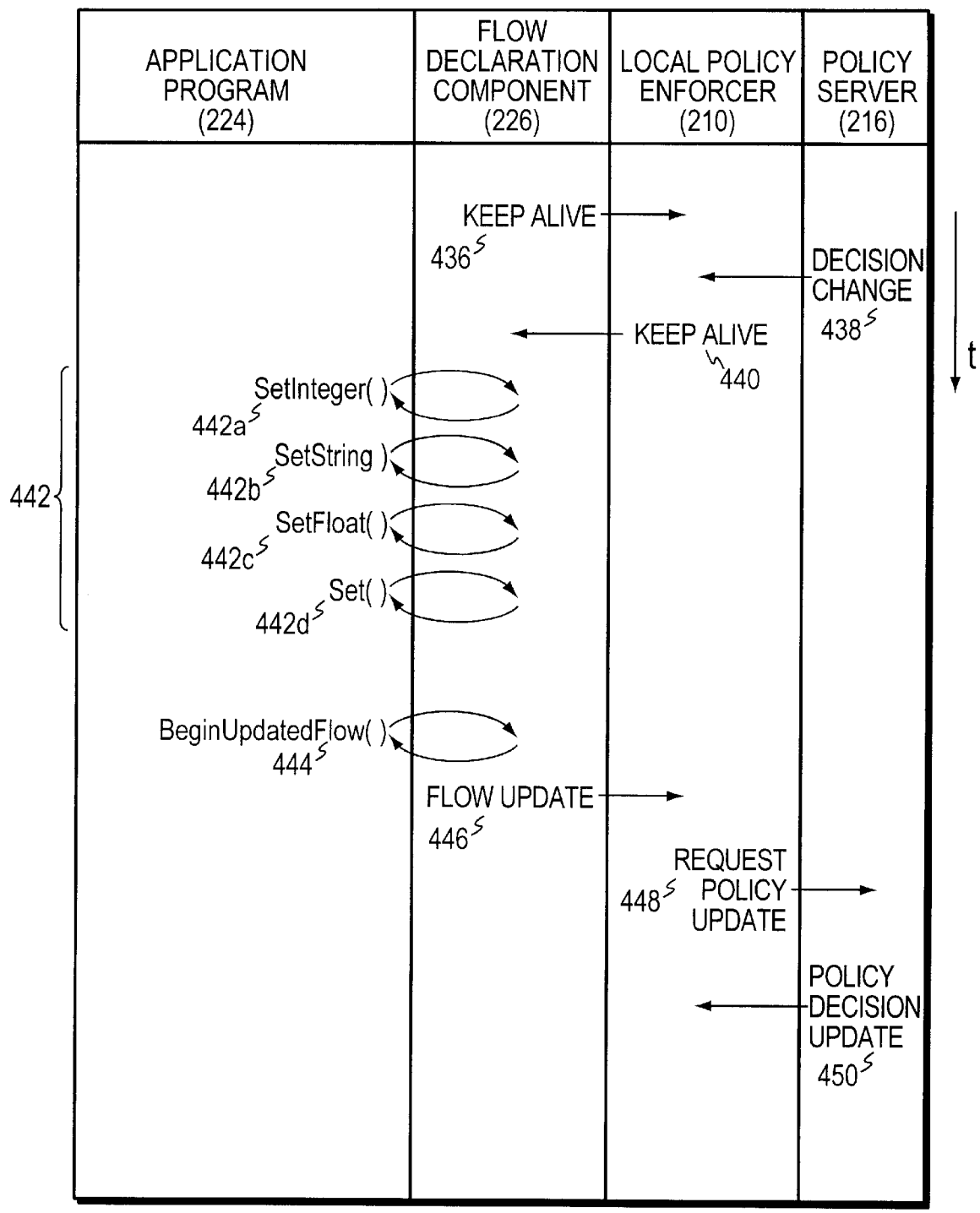
Figure 4D:
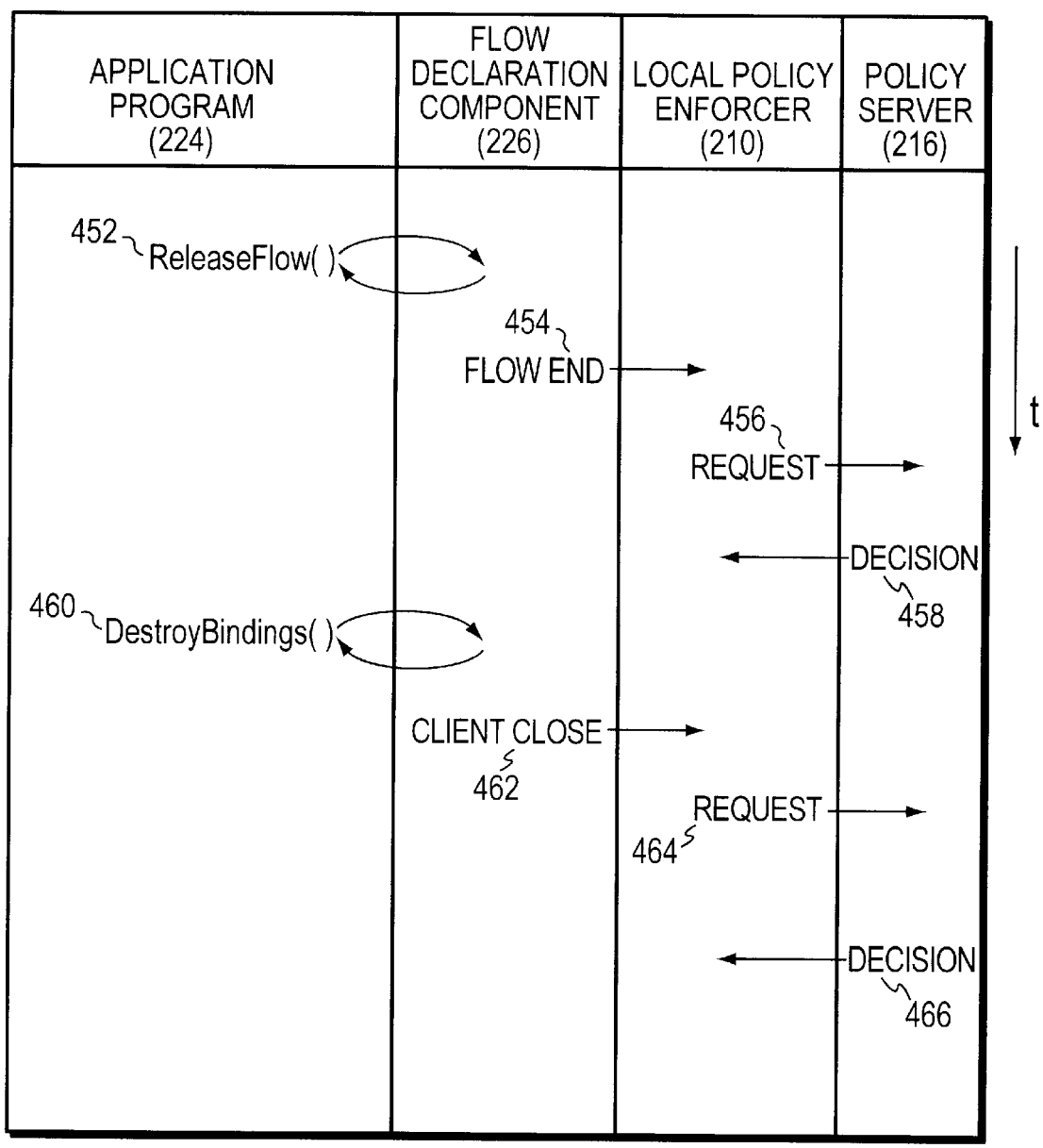

Application program 224 can also retrieve information stored at the traffic flow data structure 234 by issuing one or more Get API system calls 418 (FIG. 4B). For example, program 224 may issue a GetSourcePort( ) call 418a using the returned bindings handle HI as an argument. In response, flow declaration component 226 parses the traffic flow data structure 234 and retrieves the source port information stored therein. Component 226 then returns the GetSourcePort( ) call 418a to program 224 with the source port as an argument. Program 224 may issue similar Get API calls to retrieve other network and transport layer parameters stored at the traffic flow data structure 234.

It should be understood that additional "Get" API system calls may be defined for retrieving application-level information from the traffic flow data structure 234.

After issuing the application-level Set API calls 416, if any, the corresponding traffic flow data structure 234 is complete. That is, data structure 234 has been loaded with each of the identifying characteristics specified by the application program 224 for the anticipated traffic flow.

In accordance with the invention, the flow declaration component 226 also opens a communication session with the local policy enforcer 210 and exchanges one or more Application Parameters Declaration (APD) messages. In the preferred embodiment, the flow declaration component 226 opens a reliable, connection-based "socket" session using the well-know Transport Control Protocol (TCP) protocol of the TCP/IP communication protocol stack. A "socket" is essentially an interface between the application and transport layers of a communication protocol stack that enables the transport layer to identify which process it must communicate with in the application layer. A socket interfaces to a TCP/IP communication protocol stack via APIs consisting of a set of entry points into the stack. Applications that require TCP/IP connectivity thus use the socket APIs to interface into the TCP/IP stack. For a connection-oriented protocol (such a TCP), the socket may be considered a "session".

It should be understood that other protocols, including but not limited to connectionless protocols such as UDP, may be used to establish communication between the flow declaration component 226 and the local policy enforcer 210. Additionally, component 226 may communicate with local policy enforcer 210 at the network layer by addressing IP format APD messages to end station 212 (i.e., using the same destination address as the anticipated traffic flow) with the well-known Router Alert IP option asserted. Here, local policy enforcer 210 will intercept such asserted network layer packets and may act on them itself and/or forward them to some other network device.

Component 226 may be preconfigured with the IP address of the local policy enforcer 210 or it may dynamically obtain the address of a local policy enforcer. For example, component 226 or application program 224 may broadcast an advertisement seeking the IP address of an intermediate network device that is capable of obtaining and applying policy or service treatments to the anticipated traffic flow from program 224. Local policy enforcer 210 is preferably configured to respond to such advertisements with its IP address.

Component 226 may receive a "virtual" address that corresponds to a group of available local policy enforcers in a manner similar to the Standby Router Protocol described in U.S. Pat. No. 5,473,599, which is hereby incorporated by reference in its entirety. A single "active" local policy enforcer may be elected from the group to perform the functions described herein.

It should be further understood that the flow declaration component 226 preferably opens one TCP session with the local policy enforcer 210 per application program 224 per network interface card (NIC). More specifically, if host/server 222 is connected to network 200 through multiple LANs (each with a corresponding NIC), then traffic flows from program 224 may be forwarded onto any of these LANs. To ensure that the appropriate policy or service treatments are applied regardless of which LAN initially carries the flow, flow declaration component 226 preferably establishes a separate communication session with a local policy enforcer 210 through each LAN (i.e., through each NIC) for every program 224 that requests services from component 226.

Figure 5A:
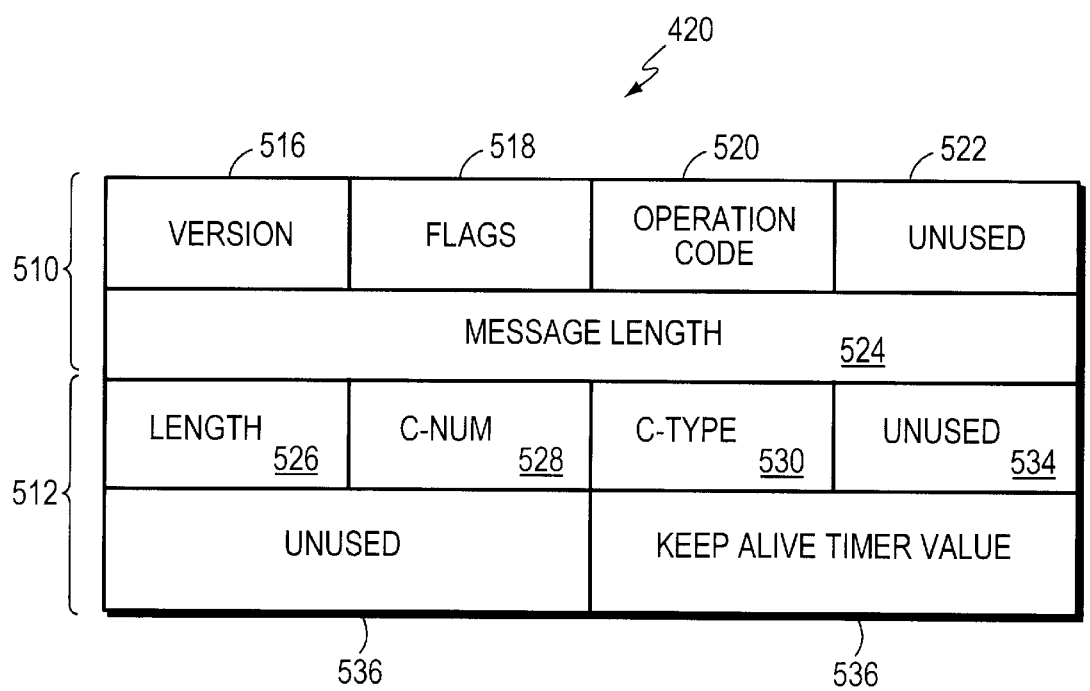
FIGS. 5A–5B are highly schematic block diagrams illustrating the preferred format of an application parameter declaration message.

In particular, flow declaration component 226 directs message generator 230 to formulate a Client Open message 420 for forwarding to the local policy enforcer 210. The Client Open message 420 establishes communication between the local policy enforcer 210 and the flow declaration component 226 and may be used to determine whether the local policy enforcer 210 has the resources to monitor the anticipated flow from the application program 224 and to apply the appropriate policy or service treatments. FIG. 5A is a block diagram of the preferred format of the Client Open message 420. In particular, the Client Open message 420 includes at least two elements: a header 510 and a timer area 512. The header 510 includes a version field 516, a flags field 518, an operation code field 520 and a message length field 524. It may also include one or more unused fields, such as field 522. Version field 516 preferably contains the version of the software being implemented at the flow declaration component 226. Flags field 518 preferably contains at least one flag that may be asserted or de-asserted by the flow declaration component 226, as described below. The operation code field 520 indicates the type of APD message. For a Client Open message 420, for example, field 520 is preferably loaded with the value "7". The message length field 524 specifies the length (in octets) of the Client Open message 420.

The timer area 512 includes a length field 526 which specifies the length (preferably in octets) of the timer area 512, a Class Number (C-Num) field 528, a Class Type (C-Type) field 530 and a Keep Alive Timer Value field 532. Timer area 512 may also include one or more unused fields, 534, 536. The Class Number field 528 is loaded with an agreed-upon value (e.g., "11") indicating that this portion of the Client Open message 420 (i.e., timer area 512) contains a keep alive timer value. Where multiple types may exist for a given class number, the Class Type field 530 is used to specify the particular type. Here, field 530 is preferably set to "1". Flow declaration component 226 preferably loads the Keep Alive Timer Value field 532 with a proposed time value (e.g., 30 seconds) to be used for maintaining the TCP session in the absence of substantive APD messages, as described below.

Message generator 230 preferably passes the Client Open message 420 down to the communication facility 228 where it is encapsulated into one or more TCP packets and forwarded to the local policy enforcer 210 in a conventional manner. The APD messages, such as the Client Open message 420, preferably use a well-known destination port number, such as 1022. The source destination port for the flow declaration component 226 may be dynamically agreed-upon when the TCP session with the local policy enforcer 210 is first established. At the local policy enforcer 210, message 420 is received at the communication engine 312 and passed up to the traffic flow state machine engine 310. The traffic flow state machine engine 310 examines the message 420 which it recognizes as a Client Open message due to the value (e.g., "7") loaded in the operation code field 520. Local policy enforcer 210 may first determine whether it has adequate resources to accept a new client. For example, local policy enforcer 210 may include an admission control module (not shown) that determines the percentage of time that its central processing unit (CPU) has remained idle recently, its available memory (for storing policies associated with component 226) and the availability of its traffic management resources, such as meter 322, marker 324 and shaper/dropper 326, to manage additional traffic flows.

Assuming local policy enforcer 210 has sufficient available resources, it replies to the flow declaration component 226 with a Client Accept message 422. The format of the Client Accept message 422 is similar to the format of the Client Open message 422 shown in FIG. 5A. In particular, the Client Accept message 422 also includes a header that is similar to header 510 and a timer area that is similar to timer area 512. The operation code for the Client Accept message 422 (which is loaded in field 520) is another predefined value (e.g., "8") so that flow declaration component 226 will recognize this APD message as a Client Accept message. The traffic flow state machine engine 310 also loads a value in the Keep Alive Timer Value field 532 which may correspond to the value proposed by component 226 or may be a new value selected by the local policy enforcer 210.

The traffic flow state machine engine 310 hands the Client Accept message 422 to its communication engine 312 which may encapsulate the message as required and forwards it to the host/server 222. At the host/server 222 the message is received at the communication facility 228 and passed up to the flow declaration component 226 where it is examined. Flow declaration component 226 examines the operation code field 520 and "learns" that it is a Client Accept message. Flow declaration component 226 also examines the keep alive timer field 532 to determine what value has been specified by local policy enforcer 210, which is used to generate additional APD messages, as described below.

It should be understood that the flow declaration component 226 may issue the Client Open message 420 as soon as the StartUp( ) call 420 is issued if not earlier.

When application program 224 is ready to begin transmitting the anticipated traffic flow (e.g., the IBM stock quote form) to end station 212, it issues a BeginFlow( ) call 424a to the flow declaration component. Preferably, the BeginFlow( ) call 424a is issued slightly before (e.g., 50 ms) program 224 begins forwarding the message to the communication facility 228. It should be understood, however, that the BeginFlow( ) call 424a may be issued at the same time as the anticipated flow to end station 212 is commenced or even slightly later. The application program 224 uses the previously returned handle H1 as an argument to the BeginFlow( ) call 424a. If program 224 wishes to receive any feedback regarding the policy or service treatments that are applied to the respective traffic flow, it may also assert a flag argument in the BeginFlow( ) call 424a and add one or more callback functions as additional arguments. The callback function preferably identifies an entry point in the application program 224 to which the requested feedback is to be returned. Program 224 may also load other information or data that will simply be returned to it with the requested feedback to assist program 224, for example, in mapping the returned feedback to a particular task.

The BeginFlow( ) call 424 is received and examined by the flow declaration component 226, which, in part, determines whether the feedback flag has been set. If so, it also looks for any callback functions and information arguments specified by program 224. Flow declaration component 226 may also return a flow handle, H2, to program 224 as an argument to the BeginFlow( ) call 424. Component 226 may also return an acknowledgment or error message as additional arguments. Assuming that the BeginFlow( ) call 424 did not cause any errors, flow declaration component 226 then directs its message generator 230 to formulate a Flow Start APD message 426.

Figure 5B:
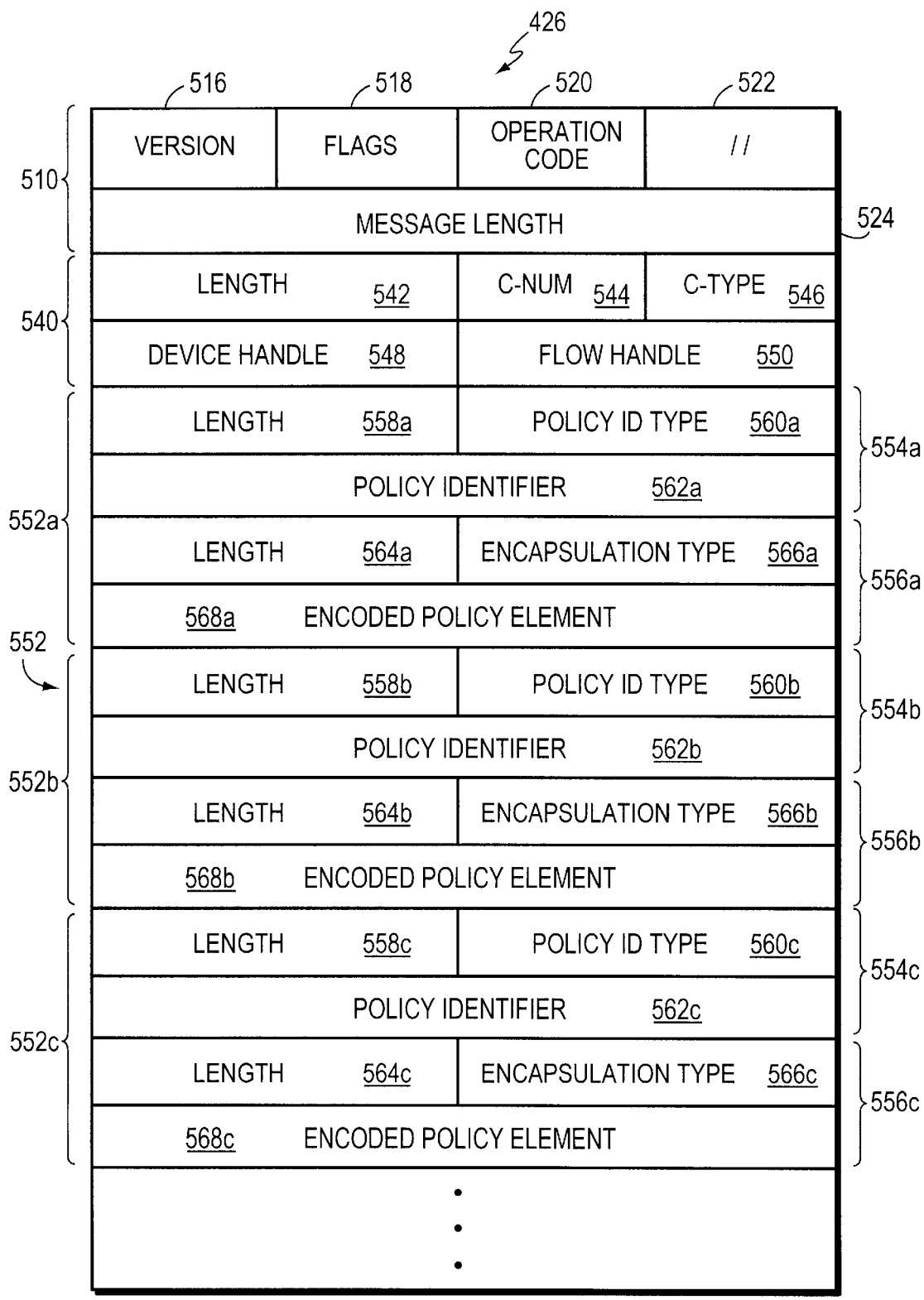

FIG. 5B is a block diagram of a preferred Flow Start message 426, which is similar to the Client Open message 420. In particular, the Flow Start message 426 includes a header 510 having a flags field 518 and an operation code field 520, among others. If program 224 requested policy feedback, then message generator 230 preferably asserts the flag in field 518. In addition, the operation code field 520 is preferably loaded with the value "1" to indicated that this particular APD message is a Flow Start message 426. Following the header 510 is a handle area 540, which includes a length field 542 (specifying the length of the handle area 540), a Class Number (C-Num) field 544, a Class Type (C-Type) field 546, a device handle field 548 and a flow handle field 550. The C-Num field 544 is loaded with an agreed-upon value (e.g., "1") indicating that this portion of the Flow Start message 426 contains a flow handle. The C-Type field 546 may also be set to "1". The device handle field 548 preferably contains a 2 octet identifier selected by the local policy enforcer 210 during establishment of the communication session. For example, the device handle may be "1327". The flow handle field 550 preferably contains the flow handle H2 generated by the flow declaration component 226 in response to the BeginFlow( ) call 424.

Following the handle area 540 are a plurality of policy bindings 552, such as policy bindings 552a, 552b and 552c. The policy bindings 552 contain encoded versions of the information stored in the traffic flow data structure 234 that corresponds to the flow handle specified in field 550. Each policy binding 552, moreover, has two elements, a policy identifier element 554 and an encoded policy instance element 556. Basically, the policy identifier element 554 identifies the type or instance of policy element that is contained in the associated encoded policy instance element 556. Each policy identifier element 554 includes a plurality of fields, including a length field 558 (specifying its length), a policy identifier (Policy ID) type field 560 and a policy identifier field 562. Each encoded policy instance element 556 similarly includes a plurality of fields, including a length field 564 (specifying its length), an encapsulation type field 566 and an encoded policy element field 568.

The first policy binding 552a, for example, may contain an encoded copy of the source port identified by program 224 with the SetSourcePort( ) call 414a and stored at the respective traffic flow data structure 234. More specifically, message generator 230 loads policy identifier field 562a with the type or instance of the policy element (e.g., "source port"). In the preferred embodiment, this name is a Policy Identifier (PID) as specified in the Internet Engineering Task Force (IETF) draft document *COPS Usage for Differentiated Services* submitted by the Network Working Group, dated December 1998, and incorporated herein by reference in its entirety. A PID specifies a particular policy class (e.g., a type of policy data item) or policy instance (e.g., a particular instance of a given policy class) in a hierarchical arrangement. The Policy ID type field 560a contains a predefined value reflecting that field 562a contains information in PID format. Component 226 preferably includes a Policy Information Base (PIB) for use in deriving the particular policy identifiers, as described in *COPS Usage for Differentiated Services*.

The message generator 230 then accesses the source port information from the respective traffic flow data structure 234 and translates it into a machine independent format suitable for transmission across network 200. For example, the source port information may be translated in accordance with the ASN.1 translation technique. The encapsulated version of the source port is then loaded in the encoded policy element field 568a of binding 552a. The encapsulation type field 566a contains a predefined value reflecting that the information in field 568a has been encapsulated according to ASN.1. Message generator 230 similarly builds additional bindings 552 that contain encapsulated versions of the source IP address, transport protocol, destination port number and destination IP address as specified by program 224 in API calls 414b–414e and stored at traffic flow data structure 234. Message generator 230 also formulates separate bindings 552 for each of the application-level data items established by the application program 224 through application-level API calls 416. Again, each of these application-level data items may be identified by a corresponding PID which is loaded in the Policy ID type field 562 of the respective binding 552. The application-level data item is then translated into a machine-independent format (e.g., through ASN.1) and loaded in the respective encoded policy element field 568, as described above.

It should be understood that other translation techniques, such as XDR, may also be used. It should be further understood that the contents of other fields, including policy identifier field 556, should be similarly translated into machine-independent format.

The Flow Start message 426 is then handed down to the communication facility 228 for transmission to the local policy enforcer 210. At the local policy enforcer 210, the message 426 is captured by the communication engine 312 and handed to the traffic flow state machine engine 310 which parses the operation code field 520 to determine that the message is a Flow Start APD message. In response, the local policy enforcer 210 proceeds to obtain the particular policy rules or service treatments that are to be applied to this flow (e.g., a stock quote form for IBM). In particular, the local policy enforcer 210 formulates a Request Policy message 428 for transmission to the policy server 216. In the preferred embodiment, the format of the Request Policy message 428 corresponds to the Request message of the Common Open Policy Service (COPS) Protocol specified in the IETF draft document *The Common Open Policy Service (COPS) Protocol*, dated Aug. 6, 1998, and incorporated herein by reference in its entirety.

According to the COPS protocol, Request messages include a plurality of flags, such as a request type flag and a message flag, and a plurality of objects. The request type flag for message 428 is preferably set to the COPS value that corresponds to "Incoming-Message/Admission Control Request" type COPS messages and the message type flag should be set to "1". Furthermore, the "In-Interface" object of the Request Policy message 428 is preferably set to the VLAN designation associated with the local policy enforcer's interface at which the Flow Start message 426 was received. The bindings 552 of the Flow Start message 426, which may not be meaningful to the local policy enforcer 210, are preferably loaded (i.e., copied as opaque objects) into the Client Specific Information (ClientSI) object portion of the Request Policy message 428. The local policy enforcer 210 also loads a unique handle that identifies the anticipated traffic flow from program 224 into the Request Policy message 428. This handle, moreover, is used in all messages exchanged between the local policy enforcer 210 and the policy server 216 for this anticipated traffic flow. The handle may be the flow handle H2 previously returned by the flow declaration component 226.

It should be understood that intermediate network devices, such as local policy enforcer 210, may learn of the identity of the policy server 216 through any conventional means, such as manual configuration or a device configuration protocol.

The Request Policy message 428 is received at the policy server 216, which examines the network parameters specified for the anticipated traffic flow, including the IP addresses, port numbers and transport protocol. The policy server 216 also examines the application-level parameters specified by program 224 and provided to the policy server 216 in the Request Policy message 428. Based on this information, the policy server 216 makes a decision regarding the policy rules or service treatments to be applied to this traffic flow. For example, as described in co-pending U.S. Patent Application Ser. No. 09/179,036, which is hereby incorporated by reference in its entirety, the policy server 216 may obtain information from the repository 218 and/or network administrator via end station 220 and, in response, formulate one or more traffic management rules, such as classification, behavioral or configuration rules. More specifically, server 216 may formulate one or more classification rules for instructing the local policy enforcer 210 to classify data packets and frames from this traffic flow with a given DS codepoint, IP Precedence and/or user priority. Policy server 216 may also formulate one or more behavioral rules that instruct the local policy enforcer 210 to map packets with the given DS codepoint to a particular queue (e.g., 330*d*) and to apply a particular scheduling algorithm (e.g., WFQ). These policy decisions or rules are then loaded into a Policy Decision message 430 and sent from the policy server 216 to the local policy enforcer 210.

Communication engine 312 captures the Policy Decision message 430 and forwards it to the traffic flow state machine engine 310, which, in turn, extracts the policy decisions or rules contained in the message 430. Traffic flow state machine engine 310 preferably establishes a flow state (not shown) for the anticipated traffic flow that includes information identifying the anticipated traffic flow (such as IP addresses, port numbers and transport protocol) and the policy decisions or rules to be applied to that traffic. Traffic flow state machine engine 310 may also build one or more data structures (such as tables) to store the mappings contained in the Policy Decision message 430.

As packets or frames are received at the local policy enforcer 210, they are examined by the packet/frame classifier 314. More specifically, the packet/frame classifier 314 parses the source and destination port fields 152, 154 (FIG. 1C) and the IP source and destination address fields 126, 128 and the protocol field 124 (FIG. 1B). This information is then supplied to the traffic flow state machine engine 310, which determines whether a traffic flow state has been established for such packets or frames. Assuming the packets or frames correspond to the anticipated flow from the program 224 to end station 212 (e.g., the IBM stock quote form), a traffic flow state will exist and have associated policy rules or service treatments as specified in the Policy Decision message 430 from policy server 216. Local policy enforcer 210 then applies the specified treatments to these packets or frames. For example, the traffic flow state machine engine 310 may instruct the packet/frame classifier, to set the DS field 132 (FIG. 1B) of such packets or frames to a value associated with best effort traffic. Similarly, the traffic flow state machine engine 310 may instruct the queue selector/mapping entity 318 to place these packets or frames in a particular (e.g., moderate priority) queue. Alternatively or in addition, packet/frame classifier may be instructed to load the ToS field 122 (FIG. 1B) or the user_priority field 108 (FIG. 1A) with predetermined values so as to implement these treatments at other intermediate network devices, such as device 208.

To the extent the application program 224 requested feedback as to the policy or service treatments applied to this traffic flow, the local policy enforcer 210 may formulate and send one or more Decision Feedback APD messages 432 to the flow declaration component 226. The Decision Feedback message 432 is similar in format to the Flow Start message 426. In particular, the Decision Feedback message 432 has a header 510 and a handle area 540. For Decision Feedback messages 432, the operation code field 520 is preferably loaded with the value "3". Appended to the handle area 540 are one or more decision bindings (not shown) that are similar in format to the policy bindings 552. In particular, each decision binding contains a treatment specified by the policy server 216 and applied by the local policy enforcer 210. For example, a first decision binding may provide that the specified traffic flow is being marked with a particular DS codepoint. Other decision bindings may specify the IP Precedence or user_priority values being entered in fields 122, 108, respectively, of this traffic flow. Other decision bindings may be more abstract and describe abstract service classes granted to the traffic flow. The Decision Request message 432 is received at the communication facility 228 and passed up to the flow declaration component 226. The flow declaration component 228 extracts the particular treatments from the decision bindings and returns them to the application program 224 through a callback function 434 specified by the application program 224 in the BeginFlow( ) call 424.

In order to maintain the TCP session established between the flow declaration component 226 and the local policy enforcer 210, the flow declaration component 226 may send one or more Keep Alive APD messages 436. The Keep Alive message 436 simply includes a header 510 with the operation code field set to "9" and the message length field 524 set to "0". Flow declaration component 226 preferably sends at least one Keep Alive message 436 within every time period specified in the keep alive timer value field 532 of the Client Accept message 422.

It should be understood that the policy server 216 may unilaterally send a Decision Change message 438 to the local policy enforcer 210 if a change in the previously supplied policy rules or service treatments occurs after the Policy Decision message 430 was sent. For example, the policy server 216 may obtain up-dated information from the repository 218 or from the network administrator through end station 220. This up-dated information may affect the policy rules or service treatments previously supplied to the local policy enforcer 210. In response, the policy server 216 preferably formulates and sends the Decision Change message 438. The format of the Decisions Change message 438 is preferably the same as the Policy Decision message 430. The Decision Change message 438 is similarly captured at the communication engine 312 of the local policy enforcer 210 and forwarded to the traffic flow state machine engine 310.

To the extent the Decision Change message 438 includes new policy rules or service treatments, the traffic flow state machine 310 preferably up-dates its traffic flow state accordingly. In addition, the traffic flow state machine 310 applies the up-dated policy rules or service treatments to subsequently received packets or frames that correspond to the traffic flow. The local policy enforcer 210 may also generate and send a Decision Feedback message (like message 432) to component 226 if feedback was requested by program 224.

The policy server 216 may also transmit one or more Decision messages to other intermediate network devices, such as device 208, that are along the path of the anticipated traffic flow from host/server 222 to end station 212. These Decision messages similarly inform the intermediate network devices as to what policy rules or service treatments to apply to the traffic flow from program 224, which presumably has already been classified by the local policy enforcer 210. Policy server 216 is thus able to provide end-to-end quality of service support.

It should be understood that the local policy enforcer 210 and the policy server 216 may exchange additional COPS messages as required, such as COPS Client Open and COPS Client Accept messages among others.

The local policy enforcer 210 may also send one or more Keep Alive APD messages 440 to the flow declaration component 226 at the host/server 222. The Keep Alive message 440 from the local policy enforcer 210 preferably has the same format as Keep Alive message 436 from component 226.

It should be further understood that the application program 224 may change certain characteristics associated with the traffic flow if the nature of the flow changes over time. For example, after reviewing the quote for IBM stock, the user at end station 212 may decide to place a "buy" order for IBM stock. In response, application program 224 may transmit a stock transaction form. Furthermore, the policies or service treatments to be applied to the traffic flow corresponding to the stock quote form may be very different from the treatments that should be applied to the traffic flow corresponding to the stock transaction form. Accordingly, the program 224 may issue one or more new application-level Set API calls 442. For example, the program may issue a SetInteger( ) call 442a, a SetString( ) call 442b, a SetFloat( ) call 442c and/or a Set( ) call 442d. These calls are generally the same as the previously described application-level Set API calls 416 and, although the program 224 utilizes the previously returned handle H1 as an argument, it enters new or updated information (e.g., stock transaction versus stock quote forms). In response, the flow declaration component 226 overwrites the corresponding entries in the respective traffic flow data structure 234 with the new or up-dated information.

The application program 224 then issues a BeginUpdatedFlow( ) call 444 at or about the time that it begins forwarding the stock transaction form to the user at end station 212. The BeginUpdatedFlow( ) call 444 is preferably the same as the BeginFlow call 424 described above. In response, the flow declaration component 226 directs the message generator 230 to generate and send a Flow Update APD message 446 to the local policy enforcer 210. The Flow Update message 446 is similar to the Flow Start message 424 and also includes one or more bindings generated from the information stored in the respective traffic flow data structure 234. Since the information contained in the traffic flow data structure 234 has been up-dated (through the issuance of the Set API calls 442), the bindings will be different from the bindings appended to the original Flow Start message 426.

At the local policy enforcer 210, the Flow Update message 446 is examined and a Request Policy Update message 428 is preferably formulated and sent to the policy server 216. The Request Policy Update message 428 has the same general format as the original COPS Request Policy message 448, although it includes the new bindings generated as a result of the Set API calls 442. The policy server 216 examines the Request Policy Update message 448 and, in response, obtains the appropriate policy rules or service treatments for this up-dated traffic flow. The policy server 216 then loads these up-dated policy rules or service treatments in a Policy Decision Update message 450, which is sent to the local policy enforcer 210. Since at least some of the traffic characteristics have changed, the policies or treatments contained in the Policy Decision Update message 450 may be different than the treatments previously provided in the Policy Decision 430. For example, the up-dated policies may provide that this traffic flow is to be classified as high priority and granted excellent effort treatment. Similarly, the up-dated policies may provide that the DS field 132 of packets or frames from this traffic flow should be loaded with a DS codepoint associated with expedited forwarding.

The Policy Decision Update message 450 is received at the local policy enforcer 210 which modifies the corresponding traffic flow state with the up-dated policies. The local policy enforcer 210 also applies these up-dated policies to any subsequently received packets or frames from the host/server 222 that satisfy the previously identified network and transport layer parameters (e.g., IP addresses, port numbers and transport protocol). Local policy enforcer 210 may also provide feedback to component 226 as described above.

When the traffic flow between the application program 224 and end station 212 is finished, program 224 preferably issues a ReleaseFlow( ) call 452 to the flow declaration component 226 using the previously returned flow handle H2 as an argument. Flow declaration component 226 may return an acknowledgment or an error message to the program 224. In response, the flow declaration component 226 directs message generator 230 to formulate a Flow End APD message 454. The format of the Flow End message 454 is preferably the same as the Flow Start message 426, although the operation code field 520 is preferably loaded with "2" to signify that it is a Flow End message. Although the flow declaration component 226 forwards the Flow End message 454 to the local policy enforcer 210, it preferably does not discard the traffic flow data structure 234.

In response, the local policy enforcer 210 formulates a COPS Request message 546 to inform the policy server 216 that the respective traffic flow is finished. The policy server 216 may reply with a Decision message 458 authorizing the local policy enforcer 210 to erase the traffic flow state which was established for this particular flow. If the application program 224 subsequently initiates another traffic flow with the same end station 212, it may re-use the information stored in the traffic flow data structure 234 by issuing another BeginFlow( ) call 424 utilizing the previously returned bindings handle H1. The flow declaration component 226, in response, proceeds as described above by sending a Flow Start message 426 to the local policy enforcer 210.

The application program 224 may also issue a DestroyBindings( ) call 460 to the flow declaration component 226 whenever it concludes that the bindings are no longer needed. Program 224 preferably utilizes the previously returned bindings handle H1 as an argument to the DestroyBindings( ) call 460. In response, component 226 preferably discards the contents of the traffic flow data structure 234 that corresponds to bindings handle H1.

When the application program 224 is closed it should shutdown all outstanding traffic flow services by issuing corresponding ReleaseFlow( ) calls 452 and it should also destroy all bindings that it created by issuing DestroyBindings( ) calls 460. In response, component 226 directs message generator 230 to formulate a Client Close APD message 462. The Client Close message 462 is simply a header 510 with the operation code field 520 loaded with the value "10". In response, the local policy enforcer 210 formulates and sends a COPS Request message 464 to the policy server 216 indicating that the program 224 is closed. The policy server 216 may reply with a COPS Decision message 466 instructing the local policy enforcer 210 to release all of the corresponding traffic flow states that were previously established for the application program 224.

One skilled in the art will recognize that two or more of the previously described API system calls may be combined into a single call or that any one call may be broken down into multiple calls. One skilled in the art will also recognize that the particular names of the API system calls is unimportant. Thus, it is an object of the present invention to cover the foregoing communicating relation between the application program 224 and the flow declaration component 226, regardless of the particular implementation ultimately chosen.

It should also be understood that any set of values may be inserted in the operation code field 520 of the APD messages provided that each APD message type (e.g., Client Open, Client Accept, Flow Start, etc.) has a different value assigned to it. Furthermore, if a local policy enforcer is unable to handle a particular application program or traffic flow (e.g., insufficient memory or other resources), it preferably responds to the Client Open message with a Client Close message, rather than a Client Accept message.

In the preferred embodiment, the flow declaration component 226 is implemented in software as a series of steps executed at the host/server 222. Nonetheless, it should be understood that the method may be implemented, either wholly or in part, through one or more computer hardware devices. Additionally, the present invention is preferably utilized only with traffic flows of sufficient length (e.g., greater than 5–10 packets). The application program 224 may be configured not to request bindings or issue API calls for short traffic flows.

It should be understood that some or all of the above described functionality of the local policy enforcer 210 may be located at the host/server 222. For example, the host/server 222 may include a traffic flow state machine engine 310 that is capable of sending and receiving COPS Request and Decision messages directly to and from the policy server 216. In this case, the Client Open, Flow Start and Flow Update messages are simply inter-process communications within the host/server 222, rather than being forwarded across the network. The operating system at the host/server 222 may also include one or more resources that may be utilized to provide traffic management services, such as classifying packets and frames (e.g., loading the DS field 132, ToS field 122 and/or user_priority field 108), scheduling packet and frame forwarding from different priority queues, etc.

It should be further understood that the local policy enforcer 210 may make policy or service treatment decisions for traffic flows identified by the flow declaration component 226 without querying the policy server 216. That is, the local policy enforcer 210 may cache certain policy rules or treatments.

In another aspect of the invention, the application program 224 may request policy decisions in advance of issuing the BeginFlow( ) call 424. For example, program 224 may only have a small number of application-level parameter bindings. After creating the bindings (using only the application-level parameters) as described above, the program 224 may issue a GetFlowDecision( ) system call to component 226 and, in return, receive a handle, H3. Component 226 issues an Obtain Decision APD message to the local policy enforcer 210 for each binding, including the specified application-level parameters. The local policy enforcer 210 will obtain the appropriate policy rules or service treatments to be applied to these, as yet un-specified, "flows" as described above.

When program 224 is about to begin a flow corresponding to one of these bindings, it may issue a BeginFlow( ) call, including the network and transport layer parameters for the traffic flow and the handle H3 for the corresponding application-level bindings. Component 226 then forwards this information in a Flow Start message 426 to the local policy enforcer 210 as described above. Since the local policy enforcer 210 has already obtained the policy or service treatments to be applied to this flow, it need not query the policy server 216. Instead, the local policy enforcer 210 simply monitors the traffic from host/server 222 and, when it identifies the specified traffic flow, applies the previously received policy rules or service treatments.

Enhanced RSVP Messaging

In a further aspect of the invention, the flow declaration component 226 may be configured to exchange one or more modified Resource reSerVation Protocol (RSVP) messages with the local policy enforcer 210 in place of the APD messages described above. RSVP is a well-known Internet Control protocol for reserving resources, typically bandwidth, between a sender entity and a receiver entity. RSVP is defined at Request for Comments (RFC) 2205, September 1997, from the Network Working Group of the IETF, and is hereby incorporated by reference in its entirety. The protocol defines two fundamental message types: RSVP path messages (Path) and reservation request messages (Resv). Basically, senders transmit Path message downstream throughout the network to potential receivers offering to supply a given message stream. Receivers, wishing to obtain the proposed message stream, transmit Resv messages that are propagated upstream all the way back to the sender. At each intermediate node in the network, bandwidth resources are reserved to ensure that the receiver will obtain the message stream.

Figure 6:
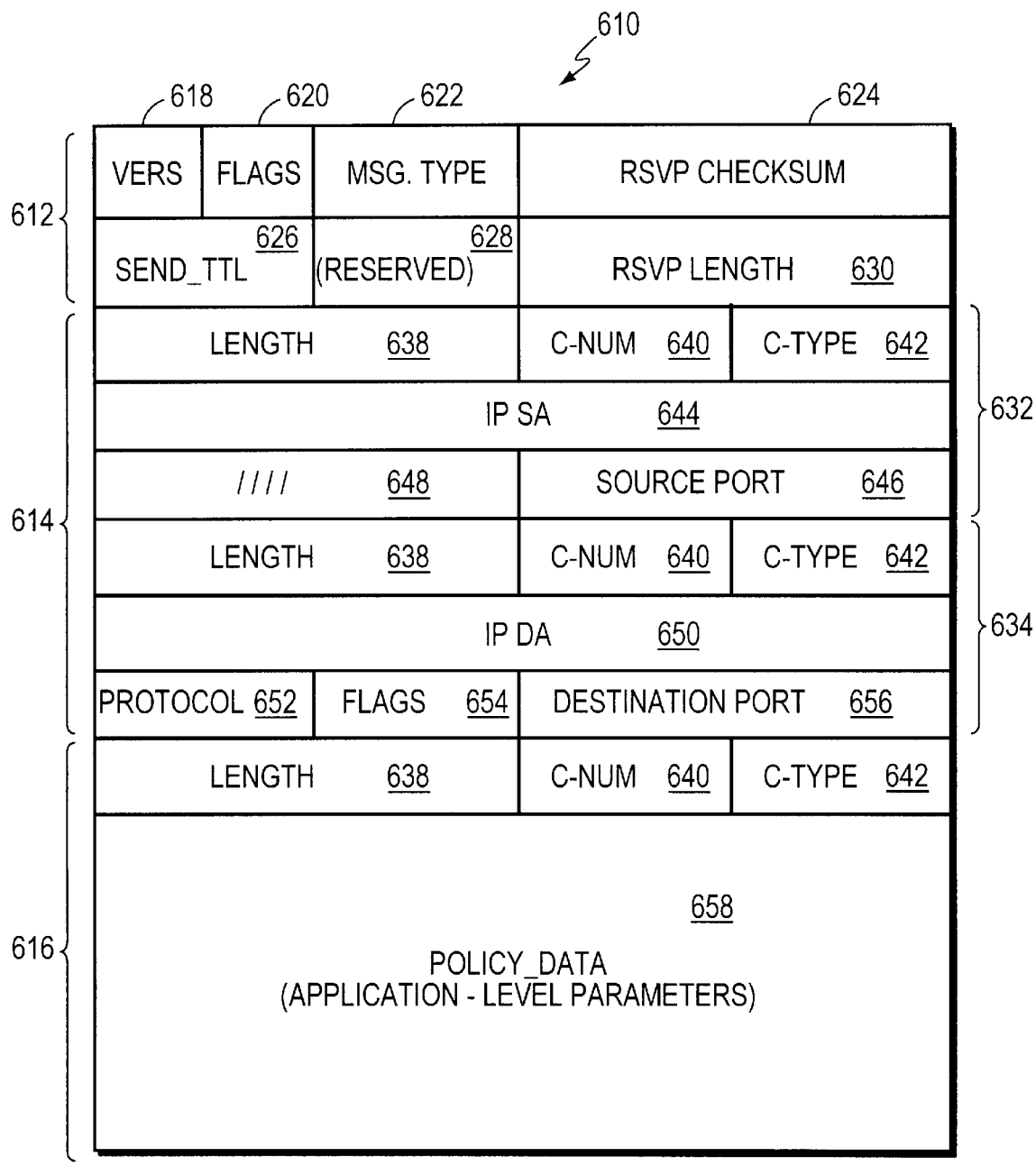
FIG. 6 is a highly schematic block diagram illustrating an enhanced Resource ReSerVation Protocol (RSVP) message in accordance with the invention.

In this embodiment of the present invention, component 226, rather than generating and forwarding the Flow Start APD message 426 in response to the BeginFlow( ) call 424, formulates and sends a modified RSVP Path message to the local policy enforcer 210. FIG. 6 is a block diagram illustrating the preferred format of a modified RSVP Path message 610. Modified Path message 610 carries the network and transport layer parameters and application-level parameters specified for the anticipated traffic flow. In particular, message 610 preferably includes at least three elements: an RSVP header 612, a first area 614 (which carries the network and transport layer parameters) and at least one RSVP Policy_Data object 616 (which carries the application-level parameters). As provided in RFC 2205, the RSVP header includes a version field 618, a flags field 620, a message type field 622, an RSVP checksum field 624, a Send Time To Live (TTL) field 626, a reserved field 628 and an RSVP length field 630.

Component 226 preferably loads version field 618, which corresponds to the version of RSVP, with the appropriate value (e.g., "1"). Flags field 620 is preferably de-asserted as no flags are presently defined. Message type field 622, which indicates the type of message (e.g., "1" for RSVP Path messages and "2" for RSVP Resv messages) is preferably loaded with the value "1" to indicate that message 610 is a Path message. It should be understood that field 622 may alternatively be loaded with a new value to indicate that message 610 is a modified RSVP Path message. The RSVP Checksum field 624 may be loaded with a computed checksum for message 610. The Send_TTL_field 626 is preferably loaded with an IP time to live value, and the RSVP length field 630 preferably contains the length of message 610.

The first area 614 preferably includes an RSVP sender template object 632 and an RSVP session object 634, each having a plurality of fields. More specifically, the sender template and session objects 632, 634 each have a length field 638 (loaded with the length of the respective object), a class number field (C-Num) 634 and a class type (C-type) field 642. For the sender template object 632, which further includes an IP source address (SA) field 644, a source port number field 646 and may include one or more un-used fields 648, the respective C-Num field 640 is preferably loaded with "11" to signify that it is an RSVP sender template object and the respective C-Type field 642 may be loaded with "1" to indicate that fields 644 and 646 carry the IPv4 address and the TCP/UDP port number, respectively, at host/server 222 for the anticipated traffic flow. For the session object 634, which further includes an IP destination address (DA) field 650, a transport protocol field 652, a flags field 654 and a destination port number field 656, the respective C-Num field 640 is loaded with "1" to signify that it is an RSVP session object and the respective C-Type field 642 may be loaded with "1" to indicate that fields 650 and 656 carry the IPv4 address and the TCP/UDP port number, respectively, for the corresponding process at end station 212 for the anticipated traffic flow. Component 226 may assert flags field 654 if it is capable of policing its own traffic flows.

One skilled in the art will recognize that first area 614 of modified RSVP Path message 610 may be modified in any number of ways, including fewer or additional fields or to carry IPv6 information.

The RSVP Policy_Data object 616 also has a length field 638, a C-Num field 640 and a C-Type 642 field. In addition RSVP Policy_Data object 616 includes a policy_data object field 658. The respective length field 638 carries the length of object 616 and the respective C-Num field is loaded with "14" to indicate that field 658 is a policy_data object field. The C-Type field 642 of object 616 is preferably loaded with a new value (e.g., "2") to signify that policy_data object field 658 carries application-level parameters. Furthermore, policy_data object field 658 is loaded by component 226 with the application-level bindings specified by program 224 preferably in the manner as described above with reference to FIG. 5B.

One skilled in the art will also recognize that the application-level parameters may be carried in multiple RSVP Policy_Data objects 616.

This modified RSVP path message 610 is preferably handed to the communication facility 228 for forwarding to the local policy enforcer 210 where it is examined. In response, the local policy enforcer 210 and the policy server 216 exchange Request Policy 428 and Policy Decision 430 messages, as described above, in order to obtain the policy rules or service treatments to be applied to the traffic flow identified in the modified RSVP Path message 610. Local policy enforcer 210 also extracts and stores the network and transport layer parameters from the RSVP Sender Template object 614 in order to identify the particular traffic flow from host/server 222.

The local policy enforcer 210 may also reply to component 226 with a modified RSVP Resv message rather than the Decision Feedback message 432. This modified RSVP Resv message preferably includes a header similar to header 612, but with the message type field 622 loaded with the value "2" to indicate that it is an RSVP Resv messages or with a new value to indicate that it is a modified RSVP Resv message. The modified RSVP Resv message also includes one or more RSVP Policy_Data objects similar to object 616. In this case, however, object 616 carries the decision bindings for the anticipated traffic flow as described above. Component 226 may extract these decision bindings in order to provide feedback to application 224.

As shown, component 226 utilizes a modified RSVP path message 610 to identify network and transport layer parameters and application-level parameters to the local policy enforcer 210. The modified RSVP Path message 610, moreover, is preferably not forwarded by the local policy enforcer 210, unlike conventional RSVP Path and Resv messages which are propagated all the way between the sender and receiver entities.

It should be understood that the local policy enforcer 210 is preferably in close proximity to host/server 222 so that the classification of packets or frames from the anticipated traffic flow occurs early in their journey through the network 200. It should also be understood that the traffic flow from end station 212 to host/server 222 may similarly be identified and appropriate policy rules or service treatments applied thereto. It should be further understood that the flow declaration component 226 is configured to handle and separately identify multiple traffic flows from multiple application programs executing at the host/server 222 so that the appropriate policy rules or service treatments may be individually applied to each such traffic flow through the network 200. For example, program 224 may be simultaneously sending a print transaction t the print server 214.

The foregoing description has been directed to specific embodiments of the invention. It will be apparent, however, that other variations and modifications may be made to the described embodiments, with the attainment of some or all of their advantages. For example, other client-server communications protocols, besides COPS, may be utilized by the policy server and the local policy enforcer. In addition, the present invention may also be utilized with other network layer protocols, such as IPv6, whose addresses are 128 bits long. Therefore, it is the object of the appended claims to cover all such variations and modifications as come within the true spirit and scope of the invention.

What is claimed is:

1. A network entity configured to communicate with a local policy enforcer through a computer network, the network entity having at least one application program executing thereon for generating a traffic flow for transmission to a second network entity through the network, the network entity comprising:
   a flow declaration component in communicating relation with the at least one application program for receiving one or more network and transport layer parameters and one or more application-level parameters identifying the traffic flow, the flow declaration component comprising:
      a memory for storing a traffic flow data structure corresponding to the traffic flow, the traffic flow data structure storing the one or more network and transport layer and one or more application-level parameters identified by the at least one application program, and
      a message generator for formulating and transmitting one or more messages to the local policy enforcer, at least one message including information from the traffic flow data structure,
   whereby, in response to the at least one message from the flow declaration component, a respective service treatment is declared for the traffic flow from the at least one application program.

2. The network entity of claim 1 wherein the at least one application program communicates with the flow declaration component through one or more Application Programming Interface (API) system calls.

3. The network entity of claim 2 wherein the flow declaration component, in response to one or more API system calls from the at least one application program, associates the traffic flow data structure with the at least one application program.

4. The network entity of claim 3 wherein the flow declaration component, in response to one or more API system calls from the at least one application program that specify one or more network and transport layer parameters for the traffic flow, fills the traffic flow data structure with the specified one or more network and transport layer parameters.

5. The network entity of claim 4 wherein the flow declaration component, in response to one or more API system calls from the at least one application program specifying a start of the traffic flow, generates a message having the specified one or more network and transport layer parameters for transmission to the local policy enforcer.

6. The network entity of claim 3 wherein the flow declaration component, in response to one or more API system calls from the at least one application program that specify one or more application-level parameters for the traffic flow, fills the traffic flow data structure with the specified one or more application-level parameters.

7. The network entity of claim 6 wherein the flow declaration component, in response to one or more API system calls from the at least one application program specifying a start of the traffic flow, generates a message having the specified one or more application-level parameters for transmission to the local policy enforcer.

8. The network entity of claim 4 wherein the flow declaration component, in response to one or more API system calls from the at least one application program that specify one or more application-level parameters for the traffic flow, fills the traffic flow data structure with the specified one or more application-level parameters.

9. The network entity of claim 8 wherein the flow declaration component, in response to one or more API system calls from the at least one application program specifying a start of the traffic flow, generates a first message having the specified one or more network and transport layer parameters and the specified one or more application-level parameters for transmission to the local policy enforcer.

10. The network entity of claim 9 wherein the first message formulated by the message generator is a Resource reSerVation Protocol (RSVP) Path message that includes:
    a first area carrying the specified one or more network and transport layer parameters; and
    one or more policy data objects carrying the specified one or more application-level parameters.

11. The network entity of claim 10 wherein the first area of the Resource reSerVation Protocol (RSVP) Path message includes a session object and a sender template object.

12. A network entity configured to communicate with a policy server through a computer network, the network entity having at least one application program executing thereon for generating a traffic flow for transmission to a second network entity through the network, the network entity comprising:
    a flow declaration component in communicating relation with the at least one application program for receiving one or more network and transport layer parameters and one or more application-level parameters identifying the traffic flow, the flow declaration component having a memory for storing a traffic flow data structure corresponding to the traffic flow, the traffic flow data structure storing the one or more network and transport layer and the one or more application-level parameters identified by the at least one application program; and
    a traffic flow state machine engine in communication with the flow declaration component, the traffic flow state machine engine including a communication engine for formulating and transmitting one or more messages to the policy server carrying information from the traffic flow data structure and for receiving one or more policy decision rules from the policy server to be applied to the traffic flow.

13. The network entity of claim 12 wherein the flow declaration component, in response to one or more Application Programming Interface (API) system calls from the at least one application program that specify one or more network and transport layer parameters and one or more application-level parameters for the traffic flow, fills the traffic flow data structure with the specified one or more network and transport layer parameters and the one or more application-level parameters.

14. The network entity of claim 13 wherein the communication engine at the traffic flow state machine engine, in response to one or more API system calls from the at least one application program specifying a start of the traffic flow, generates a first message having the specified one or more network and transport layer parameters and the one or more specified application-level parameters for transmission to the policy server.

15. In a computer network having a first network entity, a local policy enforcer, a policy server and a second network entity, the first network entity having a flow declaration component and at least one application program that are in communicating relation, the at least one application program configured to generate a traffic flow for transmission through the network to the second network entity, a method for obtaining and applying policy rules to the traffic flow comprising the steps of:

specifying one or more network and transport layer parameters for the traffic flow to the flow declaration component;

specifying one or more application-level parameters that describes an aspect of the traffic flow to the flow declaration component;

forwarding at least one message carrying the specified network and transport layer parameters and the specified application-level parameters from the flow declaration component to the local policy enforcer;

at the local policy enforcer, requesting a policy rule decision for application to the traffic flow from the policy server based on the specified network and transport layer parameters and the specified application-level parameters; and at the local policy enforcer, applying the policy rule decision to the traffic flow as it moves through the network.

16. The method of claim 15 wherein the at least one application program specifies the one or more network and transport layer parameters and the one or more application-level parameters to the flow declaration component through one or more Application Programming Interface (API) system calls.

17. The method of claim 16 further wherein the traffic flow has a start and the method further comprises the step of notifying the flow declaration component of the start of the traffic flow and further wherein the flow declaration component, in response, forwards the at least one message to the local policy enforcer.

18. The method of claim 17 wherein the at least one message forwarded by the flow declaration component is a Resource reSerVation Protocol (RSVP) Path message that includes:

a first area carrying the specified one or more network and transport layer parameters; and one or more policy data objects carrying the specified one or more application-level parameters.

19. The method of claim 18 wherein the first area of the Resource reSerVation Protocol (RSVP) Path message includes a session object and a sender template object.

20. A computer readable medium containing executable program instructions for declaring a service treatment for a plurality of network messages issued by an application program running on a network entity connected to a computer network, the network messages corresponding to a specific traffic flow, the computer network including a policy enforcer and a policy server and defining transport and network communication layers, the executable program instructions comprising program instructions for:

receiving from the application program a plurality of network and transport layer parameters corresponding to the traffic flow;

receiving from the application program one or more application-level parameters corresponding to the traffic flow;

loading the received network and transport layer parameters and the application-level parameters into one or more flow start messages; and sending the one or more flow start messages to the policy enforcer, wherein, in response to the one or more flow start message a service treatment is obtained for and applied to the traffic flow from the application program.

21. The computer readable medium of claim 20 further comprising program instructions for receiving a notification from the application program indicating that the program is ready to begin sending the network messages of the traffic flow.

22. The computer readable medium of claim 21 further comprising program instructions for:

receiving a notification from the application program indicating that the program has completed its sending of messages corresponding to the traffic flow, and issuing a flow end message to the policy enforcer signaling the end of the traffic flow.

23. The computer readable medium of claim 22 wherein the application-level parameters specify one or more of the following characteristics: the size of a file being transmitted, a video segment name, a video segment viewer, a user name, a user department, an application module identifier, a transaction type, a transaction name, an application state, a calling party, a called party, a compression method, a service level, a uniform resource locator (URL) and a mime type.

24. The computer readable medium of claim 23 further comprising program instructions for loading the received network and transport layer parameters and the received application level-parameters into a traffic flow data structure associated with the application program.

25. The computer readable medium of claim 20 wherein the one or more flow start messages contain one or more policy bindings, the policy bindings representing encoded versions of the network and transport layer parameters received from the application program.

26. The computer readable medium of claim 25 wherein the policy bindings further represent encoded versions of the application-level parameters received from the application program.

27. The computer readable medium of claim 26 wherein each policy binding includes a policy identifier (PID) element and an encoded policy instance element.

28. The computer readable medium of claim 27 wherein the PID is used to specify a type of class of the network and transport layer parameters and/or the application-level parameters.

29. The computer readable medium of claim 27 wherein the PID elements comply with the COPS Usage for Differentiated Services specification standard.

30. The computer readable medium of claim 26 further comprising program instructions for translating the application-level parameters into a machine independent format.

31. The computer readable medium of claim 30 wherein the machine independent format is Abstract Syntax Notation One (ASN.1).

32. The computer readable medium of claim 20 further comprising programming instructions for providing the service treatments to the application program through a callback function.

33. The computer readable medium of claim 20 further comprising programming instructions for sending one or more client open messages to the policy enforcer in order to open a communication session with the policy enforcer, the client open messages carrying a keep alive timer value.

34. The computer readable medium of claim 33 further comprising programming instructions for receiving one or more client accept messages from the policy enforcer, the Client Accept messages carrying a keep alive timer value.

35. The computer readable medium of claim 34 further comprising programming instructions for issuing one or more keep alive messages to the policy enforcer while the application program continues to send network messages corresponding to the traffic flow, the keep alive message sent substantially in accordance with the keep alive timer valve received from the policy enforcer.

36. The computer readable medium of claim 33 wherein a separate communication session is opened with the policy enforcer for each application program for which a service treatment is to be declared.

37. The computer readable medium of claim 21 further comprising program instructions for receiving from the application program a change in the application-level parameters for the network messages corresponding to the traffic flow.

38. The computer readable medium of claim 37 further comprising program instructions for:
receiving a notification from the application program indicating that the program is ready to begin sending the network messages corresponding to the changed application-level parameters; and
issuing one or more flow update messages to the policy enforcer, the flow update messages containing the changed application-level parameters.

39. The computer readable medium of claim 38 wherein a new service treatment is obtained for and applied to the network messages corresponding to the changed application-level parameters from the application program.

40. The computer readable medium of claim 24 wherein the service treatment is obtained in response to the policy enforcer sending one or more request policy messages to the policy server.

41. The computer readable medium of claim 40 wherein the request policy messages comply in substantial part with the Common Open Policy Service (COPS) Protocol.

42. The computer readable medium of claim 41 wherein the policy server, in response to the request policy messages, issues one or more policy decision messages to the policy enforcer, the policy decision messages containing the service treatment for the traffic flow from the application program.

43. The computer readable medium of claim 42 wherein the policy enforcer establishes a flow state for the traffic flow from the application program, the flow state including the declared network and transport layer parameters and the service treatment returned by the policy server.

44. The computer readable medium of claim 43 wherein the policy enforcer
compares messages originated by the application program with the declared network and transport layer parameters, and
applies the service treatment to messages matching the network and transport layer parameters.

45. The computer readable medium of claim 44 wherein the policy enforcer, in applying the service treatment, performs one or more of:
setting a Differentiated Services (DS) codepoint field of matching network messages from the application program,
setting a Type of Service (ToS) field of matching network messages from the application program, and
setting a user_priority field of matching messages from the application program.

46. The computer readable medium of claim 43 further comprising program instructions for discarding the contents of the traffic flow data structure in response to receiving the notification from the application program that the program has completed its sending of messages.

47. The computer readable medium of claim 46 wherein the policy enforcer, in response to the flow end message, erases the traffic flow state established for the traffic flow from the application program.

* * * * *